(12) United States Patent
Ito

(10) Patent No.: US 8,184,380 B2
(45) Date of Patent: May 22, 2012

(54) LENS BARREL

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 12/743,417

(22) PCT Filed: Dec. 25, 2008

(86) PCT No.: PCT/JP2008/003944
§ 371 (c)(1),
(2), (4) Date: May 18, 2010

(87) PCT Pub. No.: WO2009/084192
PCT Pub. Date: Jul. 9, 2009

(65) Prior Publication Data
US 2010/0277813 A1    Nov. 4, 2010

(30) Foreign Application Priority Data

Dec. 28, 2007  (JP) ................. 2007-340582
Dec. 28, 2007  (JP) ................. 2007-340583
Dec. 28, 2007  (JP) ................. 2007-340584

(51) Int. Cl.
*G02B 15/14* (2006.01)
(52) U.S. Cl. ........................ 359/694; 359/819
(58) Field of Classification Search ............ 359/819
See application file for complete search history.

(56) References Cited

U.S. PATENT DOCUMENTS

| | | | |
|---|---|---|---|
| 4,264,178 A | 4/1981 | Muryoi | |
| 5,946,519 A * | 8/1999 | Chao et al. | 396/546 |
| 7,446,962 B2 | 11/2008 | Matsumoto et al. | |
| 7,760,996 B2 | 7/2010 | Miyamori et al. | |
| 7,796,347 B2 | 9/2010 | Ito | |
| 2002/0159774 A1 | 10/2002 | Koyama et al. | |
| 2004/0223234 A1 | 11/2004 | Konno | |
| 2005/0168834 A1* | 8/2005 | Matsumoto et al. | 359/694 |

(Continued)

FOREIGN PATENT DOCUMENTS

CN  101140351  3/2008

(Continued)

OTHER PUBLICATIONS

International Search Report of PCT Application No. PCT/JP2008/003944 dated Feb. 3, 2009.

*Primary Examiner* — James Jones
(74) *Attorney, Agent, or Firm* — Panasonic Patent Center; Dhiren Odedra; Kerry Culpepper

(57) ABSTRACT

A lens barrel is provided with which manufacturing costs can be reduced. The lens barrel (3) has a first lens group (G1), a second lens group (G2), a third lens group (G3), a first support frame (10) that supports the first lens group (G1), a second support frame (20) that supports the second lens group (G2), a third support frame (30) that supports the third lens group (G3), a first driving unit (50), a second driving unit (60), and a shutter unit (29) that is fixed to the second support frame (20). The first lens group (G1) has an overall negative refractive power, and includes a prism (PR). The second support frame (20) is driven along a second optical axis (A2) by the first driving unit (50). The third support frame (30) is driven along the second optical axis (A2) by the second driving unit (60).

18 Claims, 21 Drawing Sheets

U.S. PATENT DOCUMENTS

| | | |
|---|---|---|
| 2006/0285840 A1 | 12/2006 | Takahashi |
| 2008/0056698 A1 | 3/2008 | Lee et al. |

FOREIGN PATENT DOCUMENTS

| | | |
|---|---|---|
| JP | 2000-310803 | 11/2000 |
| JP | 2001-281513 | 10/2001 |
| JP | 2002-131611 | 5/2002 |
| JP | 2002-258132 | 9/2002 |
| JP | 2003-241056 | 8/2003 |
| JP | 2005-351932 | 12/2005 |
| JP | 2006-91370 | 4/2006 |
| JP | 2006-322984 | 11/2006 |
| JP | 2007-17957 | 1/2007 |
| JP | 3925457 B | 3/2007 |
| JP | 2007-199402 | 8/2007 |
| JP | 2007-271649 | 10/2007 |
| JP | 2007-271670 | 10/2007 |
| JP | 2007-292997 | 11/2007 |

* cited by examiner

LENS BARREL

CROSS-REFERENCE TO RELATED APPLICATIONS

This application is a National Stage of International Application No. PCT/JP2008/003944 filed Dec. 25, 2008 claims priority under 35 U.S.C. §119(a) to Japanese Patent Application No. 2007-340582, filed in Japan on Dec. 28, 2007, Japanese Patent Application No. 2007-340583, filed in Japan on Dec. 28, 2007, and Japanese Patent Application No. 2007-340584, filed in Japan on Dec. 28, 2007, the entire contents of which are hereby incorporated herein by reference.

TECHNICAL FIELD

The technology disclosed herein relates to a lens barrel having a bending optical system.

BACKGROUND ART

Digital cameras that make use of imaging elements have become very popular in recent years. With digital camera, there has been a need not only for a greater number of pixels in the imaging elements, but also for higher performance of the lens barrel, which forms an optical image on the imaging elements. More specifically, there is a need for a lens barrel equipped with a higher-power zoom lens system.

Meanwhile, in the field of digital camera, the main body needs to be made smaller in order to make the product more portable. There is therefore a need for a more compact imaging device equipped with a lens barrel and an imaging element, which should contribute greatly to the goal of obtaining a smaller main body. To reduce the size of an imaging device, a so-called bending optical system has been proposed in which the optical path is bent along the zoom lens system (see Patent Citations 1 to 4, for example).

Patent Citation 1: Japanese Patent No. 3,925,457
Patent Citation 2: Japanese Laid-Open Patent Application 2007-17957
Patent Citation 3: Japanese Laid-Open Patent Application 2007-271649
Patent Citation 4: Japanese Laid-Open Patent Application 2005-351932

DISCLOSURE OF INVENTION

An imaging optical system usually has a plurality of lens groups. Whether the refractive power of the first lens group that takes in light from a subject is positive or negative affects how small the lens barrel can be made, the magnification ratio of the optical system, and so forth.

For instance, if the first lens group has a positive refractive power (in the case of an imaging optical system that is called a positive lead type), it is easy to attain a high magnification ratio, but the quantity of lenses is greater, which is disadvantageous in terms of making the lens barrel smaller.

On the other hand, if the first lens group has a negative refractive power (in the case of an imaging optical system that is called a negative lead type), it is more difficult to attain a high magnification ratio than with a positive lead type, but there are fewer lenses, which is advantageous in terms of making the lens barrel smaller, and is also suited to achieving a wider angle.

Thus, when the first lens group has a negative refractive power, it is easier to obtain a lens barrel that is compact and has a wider angle.

Nevertheless, with a negative lead type of imaging optical system, a second lens group having positive refractive power and third lens group having negative refractive power must be movably provided behind the first lens group, so an aperture unit and a shutter unit must be moved according to the movement of these lens groups. Accordingly, a mechanism for driving these units is necessary, which increases the number of parts required, and this can drive up the manufacturing cost.

It is a first object to provide a lens barrel with which manufacturing costs can be reduced.

Also, an aperture unit has a plurality of aperture blades, but since there needs to be a certain amount of distance from the lenses to the aperture blades, it is more difficult to reduce the size of a lens support structure that includes lenses and an aperture unit.

It is a second object to provide a lens support structure whose size can be reduced.

A lens barrel according to a first aspect is a lens barrel for forming an optical image of a subject, comprising a first lens group, a second lens group, a third lens group, a first support frame, a first support mechanism, a first driving unit, a luminous energy adjusting unit, and an optical path blocking unit. The first lens group is a lens group that receives a light beam coming from the subject along a first optical axis from, and has a bending optical element that reflects a light beam incident along the first optical axis along a second optical axis that intersects the first optical axis. The second lens group receives a light beam that has passed through the first lens group. The third lens group receives a light beam that has passed through the second lens group. The first support frame supports the first lens group. The first support mechanism is a mechanism that supports the second lens group movably with respect to the first lens group along the second optical axis, and has a second support frame that supports the second lens group. The first driving unit imparts a drive force to the second support frame so that the second lens group moves along the second optical axis. The luminous energy adjusting unit is a mechanism for adjusting the amount of light passing through the second lens group or the amount of light emitted from the second lens group, and is fixed to the second support frame. The optical path blocking unit is a mechanism for opening or blocking the optical path along the second optical axis, and is fixed to the second support frame.

With this lens barrel, since the luminous energy adjusting unit and the optical path blocking unit are fixed to the second support frame, the first driving unit can be shared by the second support frame, the luminous energy adjusting unit, and the optical path blocking unit, and there is no need to provide a separate driving unit for the luminous energy adjusting unit and the optical path blocking unit. This simplifies the constitution of the lens barrel, and reduces its manufacturing costs.

A lens barrel according to a second aspect is the lens barrel according to the first aspect, wherein the luminous energy adjusting unit is disposed on the first lens group side of the second support frame along the second optical axis.

A lens barrel according to a third aspect is the lens barrel according to the first or second aspect, wherein the optical path blocking unit is disposed on the opposite side of the second support frame from the first lens group side along the second optical axis.

A lens barrel according to a fourth aspect is the lens barrel according to any one of the first to third aspects, wherein the optical path blocking unit has an optical path blocking mechanism provided so as to allow the optical path to be opened and blocked along the second optical axis, and a blocking drive motor that drives the optical path blocking mechanism. The blocking drive motor is disposed more to the first lens group side than the optical path blocking mechanism along the second optical axis.

A lens barrel according to a fifth aspect is the lens barrel according to any one of the first to fourth aspects, further comprising a main body frame to which the first support mechanism is provided. The luminous energy adjusting unit has a luminous energy adjusting mechanism with which the aperture can be adjusted by utilizing a rotational force around the second optical axis, and a transmission member provided so as to be able to transmit the rotational force to the luminous energy adjusting mechanism. The main body frame has a guide portion that converts the linear motion of the second support frame along the second optical axis with respect to the main body frame into rotary motion of the transmission member around the second optical axis.

A lens barrel according to a sixth aspect is the lens barrel according to the fifth aspect, wherein the transmission member extends from the luminous energy adjusting mechanism in a direction perpendicular to the second optical axis. The guide portion has a guide groove into which the transmission member is inserted, and which is inclined with respect to a direction along the second optical axis.

A lens barrel according to a seventh aspect is the lens barrel according to any one of the first to sixth aspects, wherein the first lens group has an overall negative refractive power.

A lens support structure according to an eighth aspect comprises a lens having a convex face, a lens support frame that supports the lens, and an aperture member that is fixed to the lens support frame. At least part of the convex face of the lens is disposed within the opening of the aperture member along the optical axis of the lens.

With this lens support structure, since at least part of the convex face of the lens is disposed within the opening of the aperture member along the optical axis of the lens, the aperture member can be disposed closer to the lens. This shortens the overall length of the aperture member and the lens along the optical axis, and affords a more compact size.

A lens support structure according to a ninth aspect is the lens support structure according to the eighth aspect, wherein the aperture member is provided so that its position with respect to the lens does not change.

Figure 1:
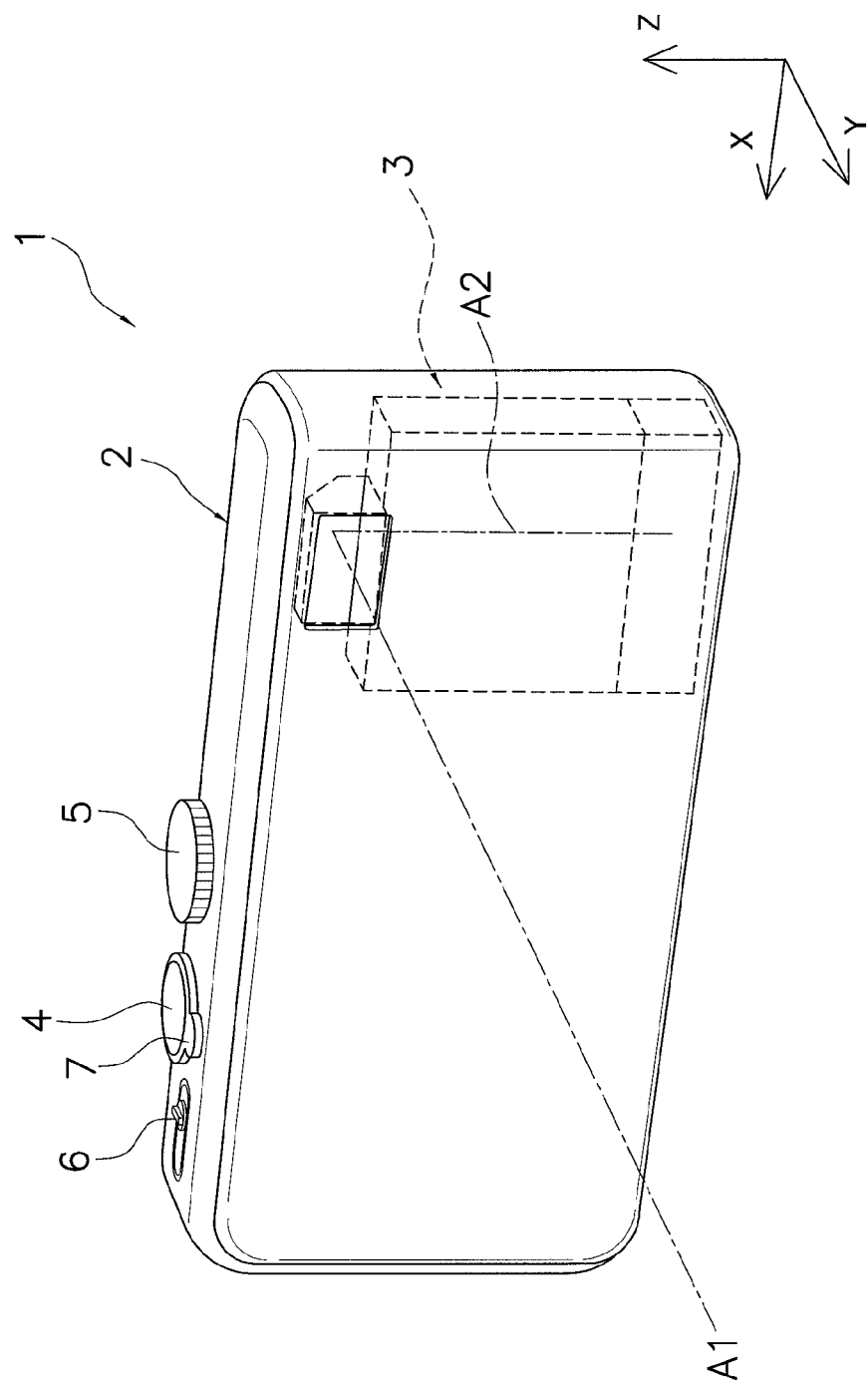
FIG. 1 is a simplified perspective view of a digital camera.

EXPLANATION OF REFERENCE 1 digital camera
2 camera body
3 lens barrel
10 first support frame
12 forward portion
12a first protrusion
20 second support frame
21 second support frame main body
22 aperture unit (luminous energy adjusting unit)
22a aperture mechanism (aperture member)
23 first guide portion
24 second guide portion
25 first drive member
26 neutral density filter (optical element)
27 shutter drive motor (blocking drive motor)
28 filter drive motor (element drive motor)
29 shutter unit (optical path blocking unit)
30 third support frame
40 lens drive device (optical element drive device)
41 fourth support frame
50 first driving unit
51 first drive motor
52 first lead screw (first drive shaft)
53 first frame
60 second driving unit
61 second drive motor
62 second lead screw (second drive shaft)
63 second frame
70 main body frame
71 forward plate
72 guide portion
72a guide groove
G1 first lens group
G2 second lens group
G3 third lens group
G4 fourth lens group

BEST MODE FOR CARRYING OUT THE INVENTION

Overview of Digital Camera

Figure 2:
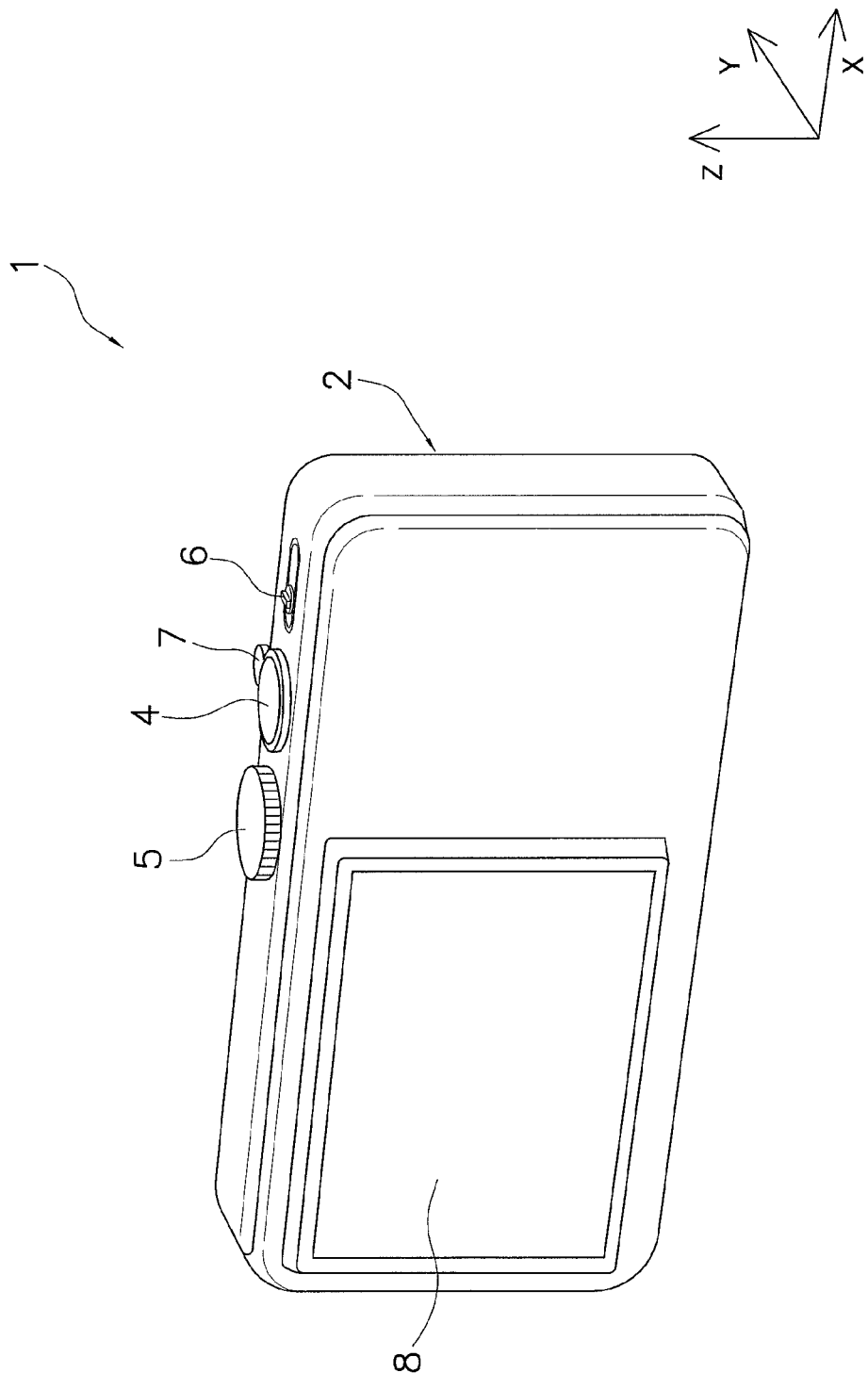
FIG. 2 is a simplified perspective view of a digital camera.

A digital camera 1 according to an embodiment will now be described through reference to FIGS. 1 and 2. FIGS. 1 and 2 are simplified perspective views of the digital camera 1.

The digital camera 1 is a camera for capturing an image of a subject, and employs a bending optical system for boosting magnification and reducing the overall size.

In the following description, the six sides of the digital camera 1 are defined as follows.

The side facing the subject when an image is being captured by the digital camera 1 is called the front face of a camera main body 2, and the face on the opposite side is called the rear face. When an image is captured such that the top and bottom in the vertical direction of the subject match up with the top and bottom in the short-side direction of the rectangular image being captured by the digital camera 1 (the aspect ratio (the ratio of long to short sides) is generally 3:2, 4:3, 16:9, etc.), the side facing upward in the vertical direction is called the top face, and the opposite side is called the bottom face. Further, when the an image is captured such that the top and bottom in the vertical direction of the subject match up with the top and bottom in the short-side direction of the rectangular image being captured by the digital camera 1, the side that is on the left when viewed from the subject side is called the left face, and the opposite side is called the right face. The above definitions are not intended to limit the usage orientation of the digital camera 1.

Based on the above definitions, FIG. 1 is a perspective view illustrating the front face, top face, and right face.

The same definitions apply not only to the six sides of the digital camera 1, but also to the six sides of the various constituent members disposed on the digital camera 1. That is, the above definitions apply to the six sides of the various constituent members when they have been disposed in the digital camera 1.

As shown in FIG. 1, a three-dimensional perpendicular coordinate system is defined, having a Y axis perpendicular to the front face of the camera main body 2. Based on this definition, the direction facing the front face side from the rear face side is called the Y axis positive direction, the direction facing the left face side from the right face side is called the X axis positive side, and the direction facing the top face side from the bottom face side and perpendicular to the X and Y axes is called the Z axis positive direction.

The drawings will be described below using this XYZ coordinate system as a reference. That is, the X axis positive side, the Y axis positive direction, and the Z axis positive direction in the drawings each refer to the same respective direction.

Overall Configuration of Digital Camera

As shown in FIGS. 1 and 2, the digital camera 1 mainly includes a camera main body 2 that houses various units, a lens barrel 3 for forming an optical image of a subject, and an imaging unit 90. The imaging unit 90 has an imaging element 91 for converting an optical image into an image signal, and examples of the imaging element 91 include a CCD (charge coupled device) and a CMOS (complementary metal-oxide semiconductor) sensor.

A release button 4, a control dial 5, a power switch 6, and a zoom adjusting lever 7 are provided to the top face of the camera main body 2 so that the user can control the imaging operation, etc. The release button 4 is used by the user to input the exposure timing. The control dial 5 is used by the user to make various settings related to imaging operation. The power switch 6 is used by the user to turn the digital camera 1 on or off. The zoom adjusting lever 7 is used by the user to adjust the zoom magnification, and is able to rotate around the release button 4 within a specific angular range. A liquid crystal monitor 8 that displays images captured by the imaging element 91 is arranged on the rear face of the camera main body 2.

Configuration of Lens Barrel

Figure 3:
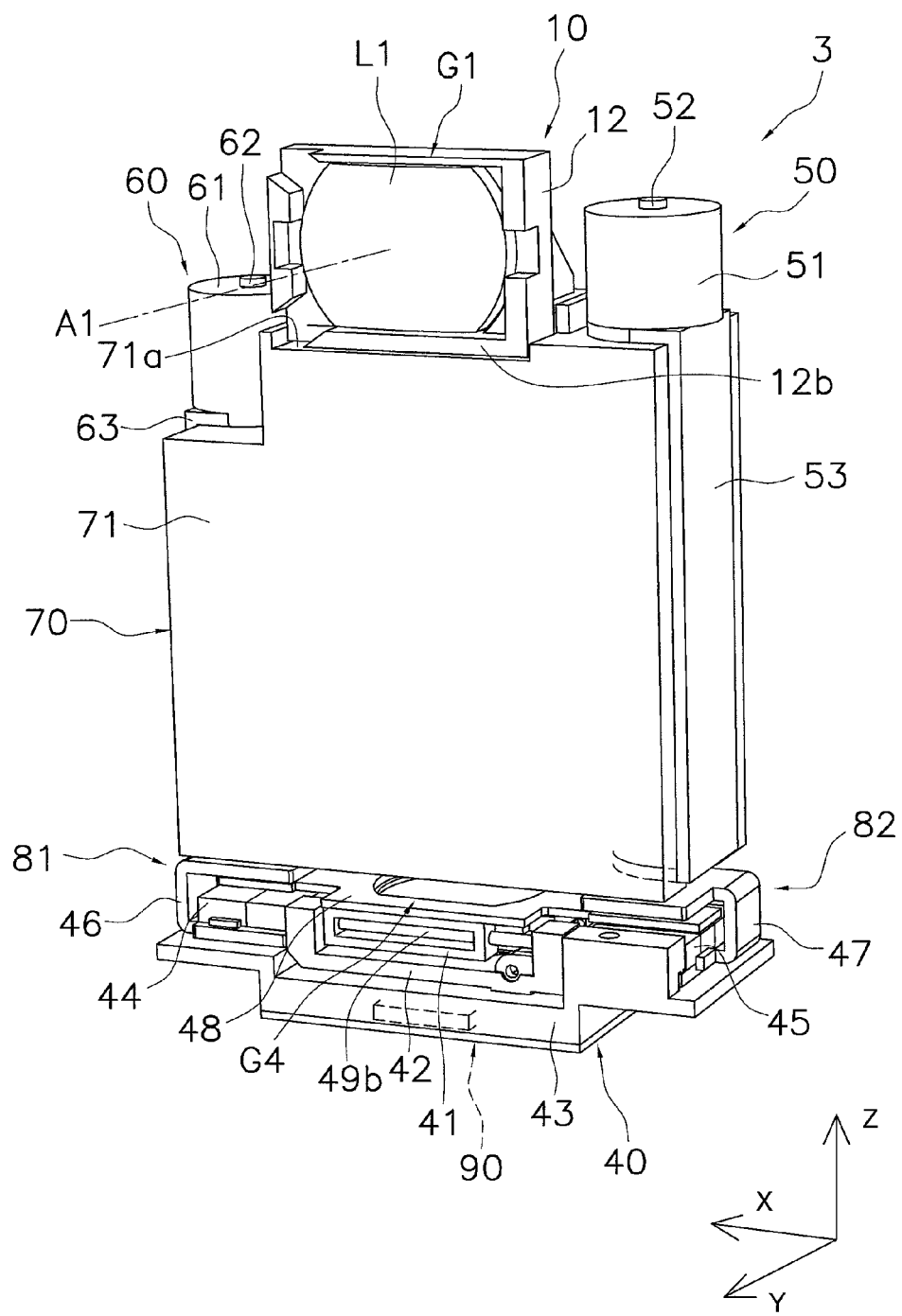
FIG. 3 is a simplified perspective view of a lens barrel.
Figure 4:
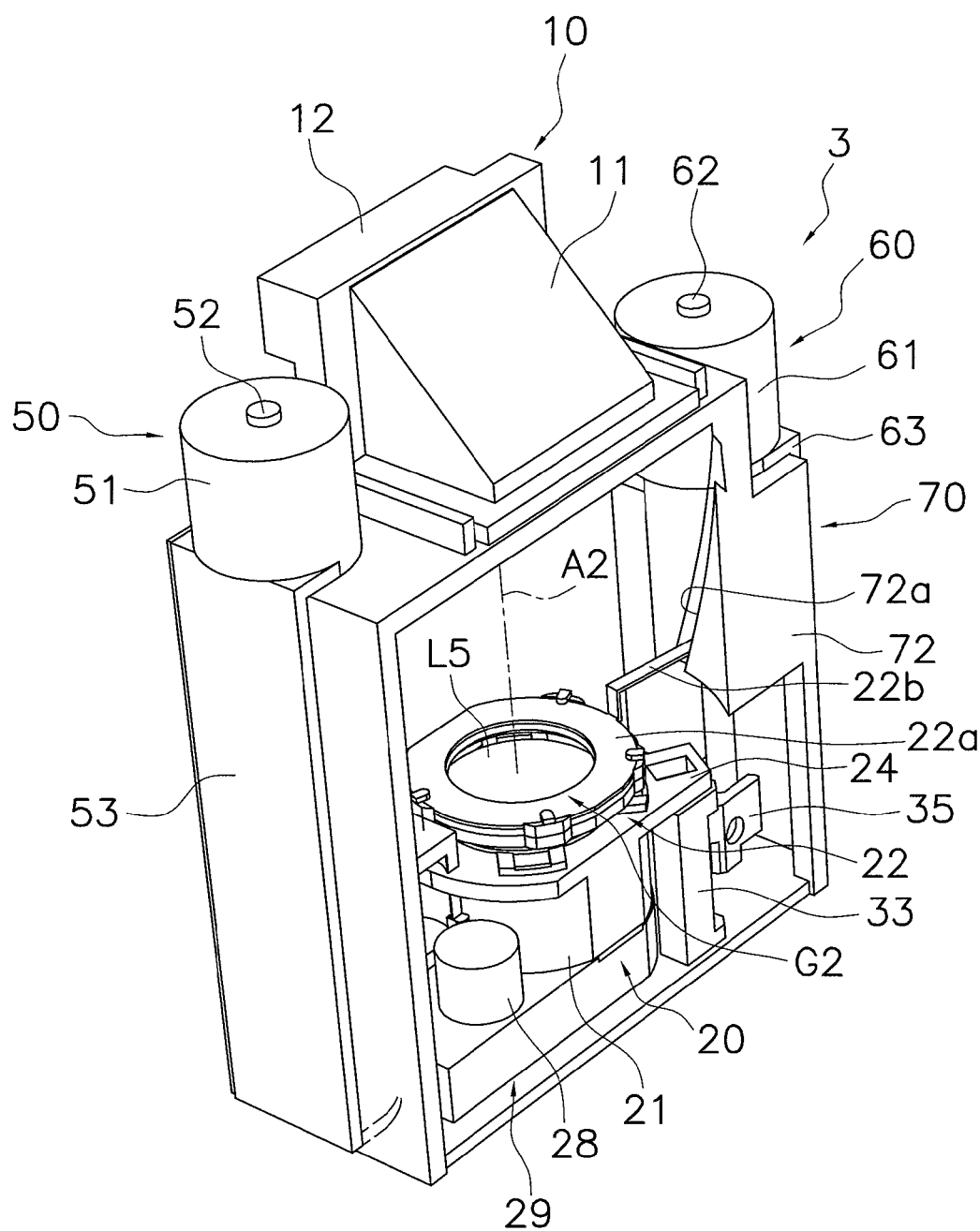
FIG. 4 is a simplified perspective view of a lens barrel.
Figure 5:
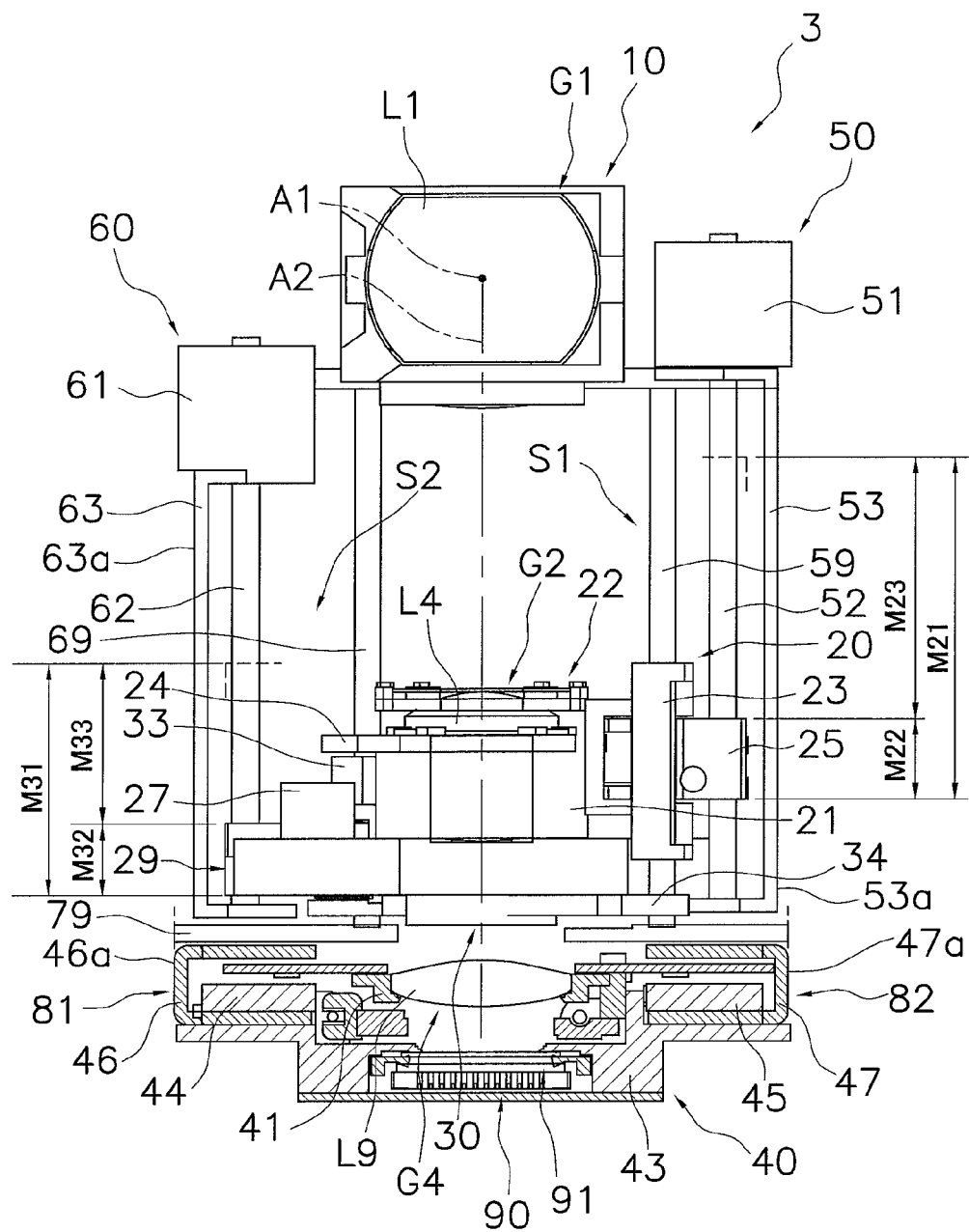
FIG. 5 is a front view of a lens barrel.
Figure 6:
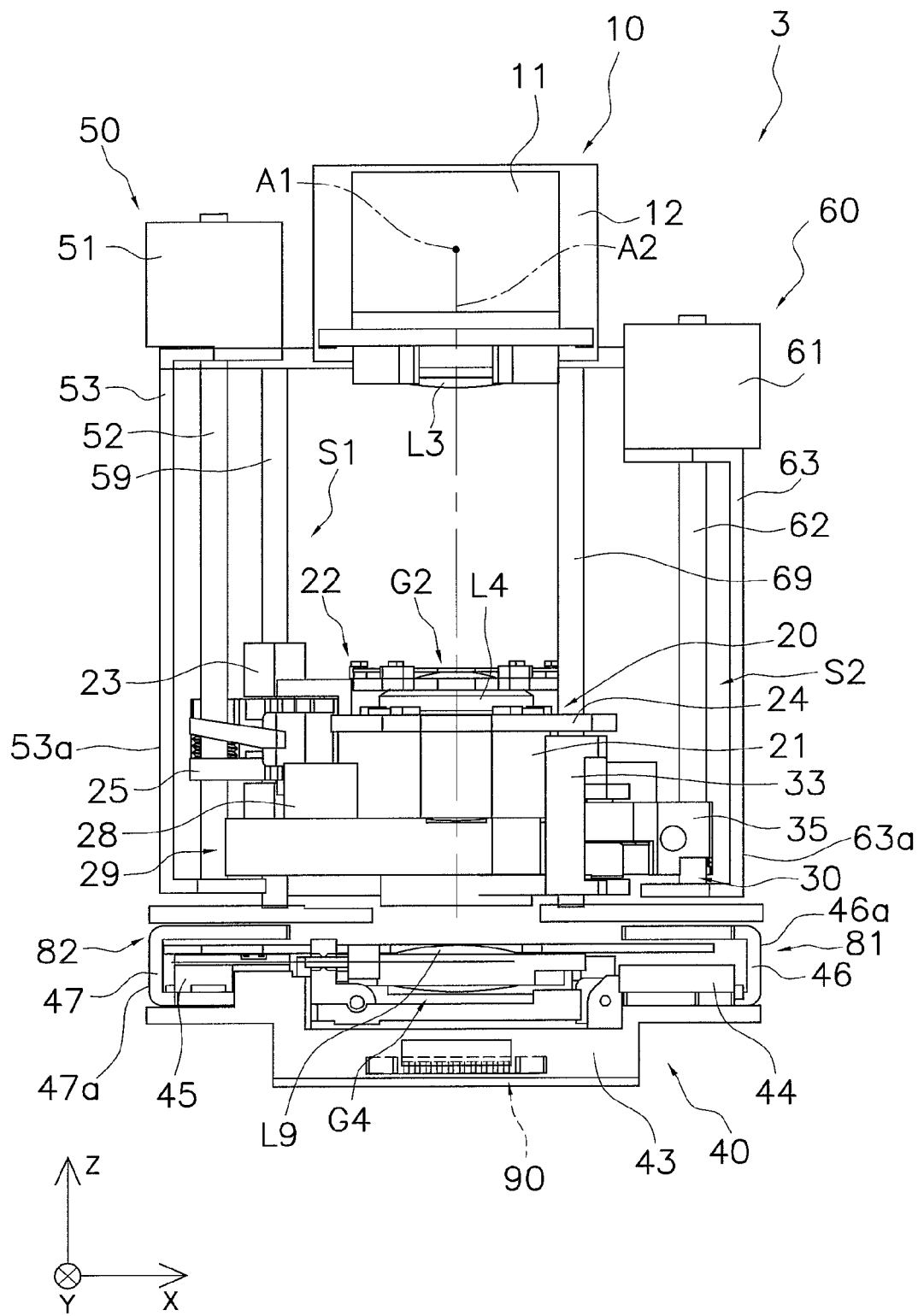
FIG. 6 is a rear view of a lens barrel.
Figure 7:
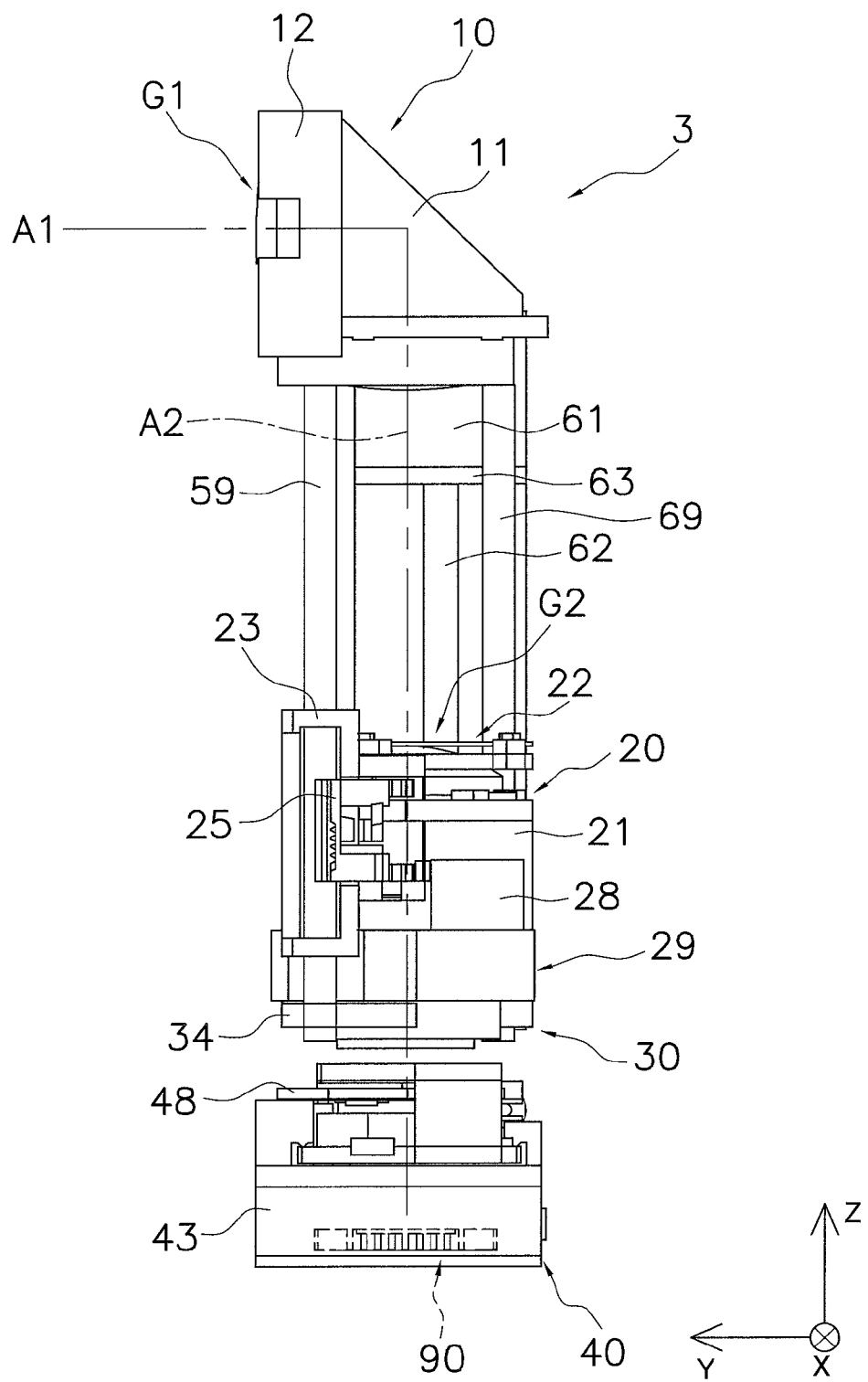
FIG. 7 is a side view of a lens barrel.
Figure 8:
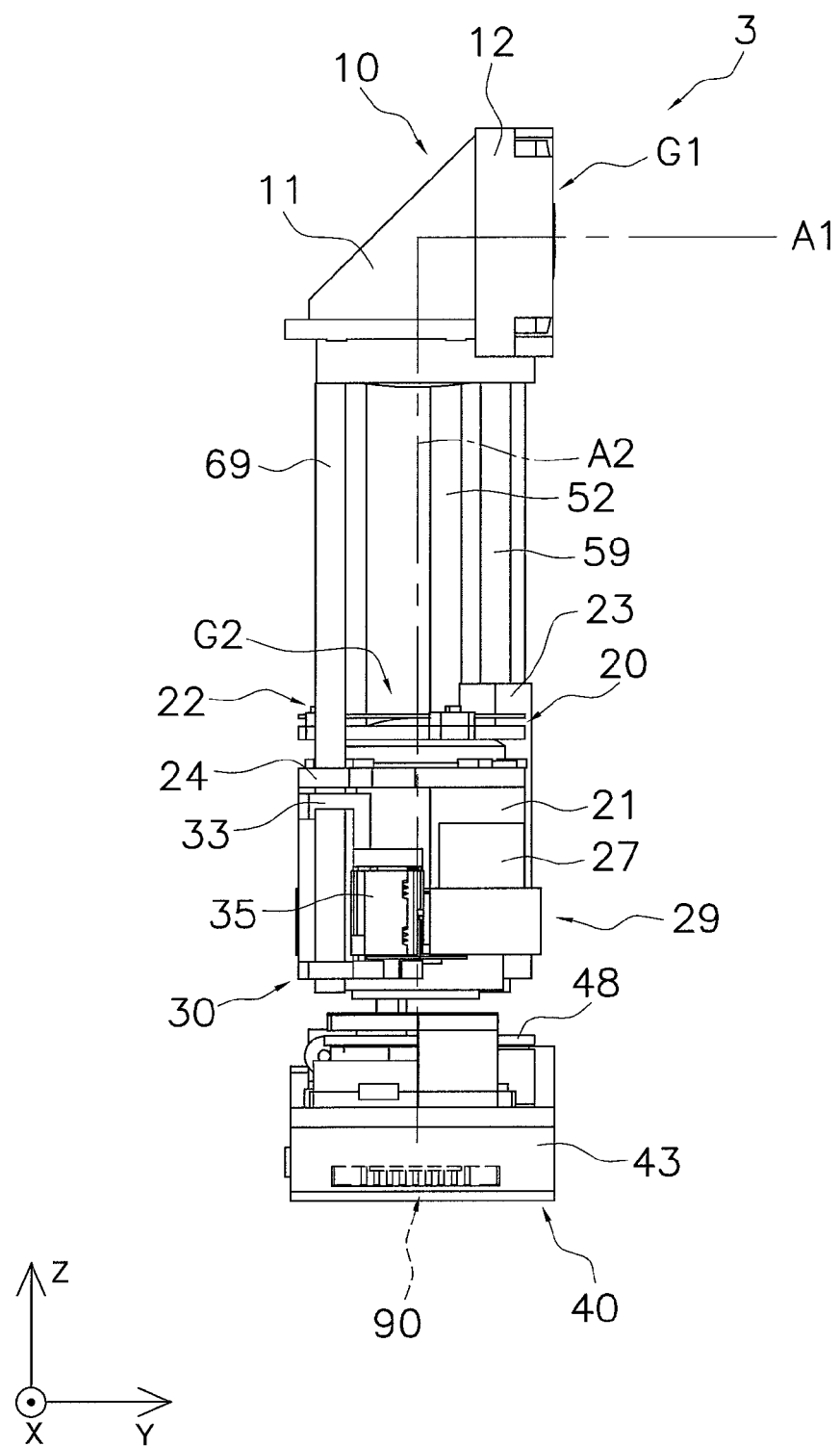
FIG. 8 is a side view of a lens barrel.

The configuration of the lens barrel 3 will be described through reference to FIGS. 3 to 21. FIGS. 3 and 4 are simplified perspective views of the lens barrel 3. FIG. 5 is a front view of the lens barrel 3. FIG. 6 is a rear view of the lens barrel 3. FIGS. 7 and 8 are side views of the lens barrel 3. In FIGS. 5 to 8, part of a main body frame 70 is omitted so that the internal structure of the lens barrel 3 can be seen.

Figure 9:
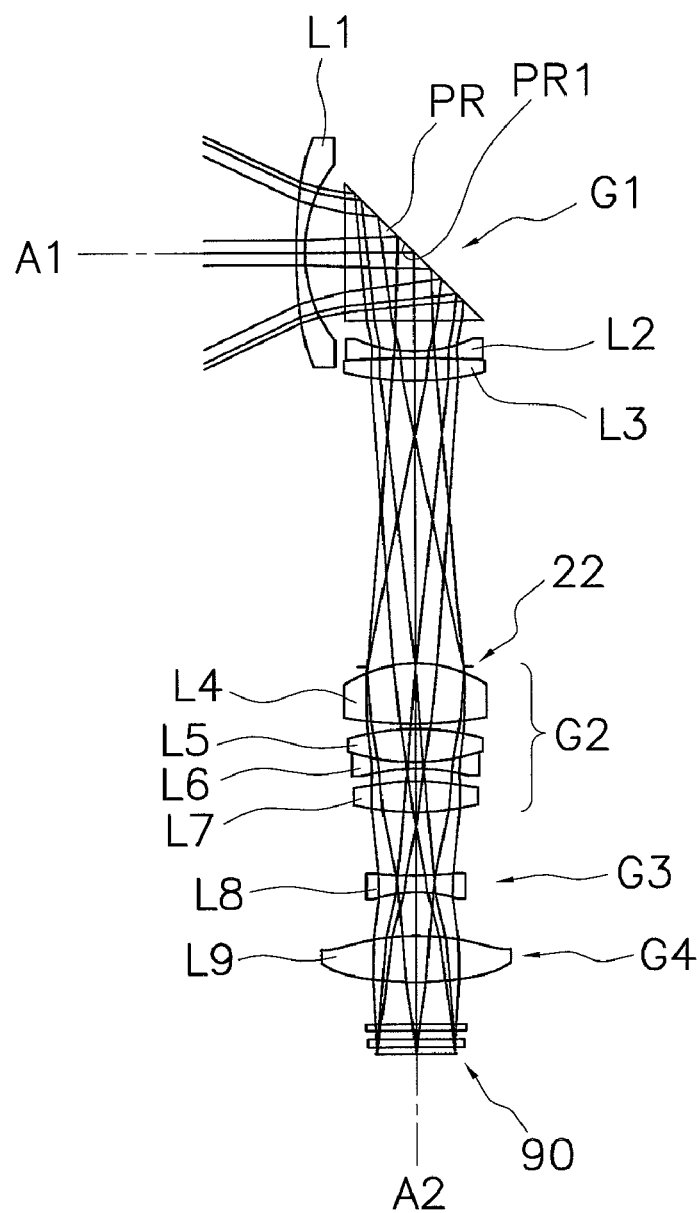
FIG. 9 is a diagram of the configuration of an imaging optical system.
Figure 10:
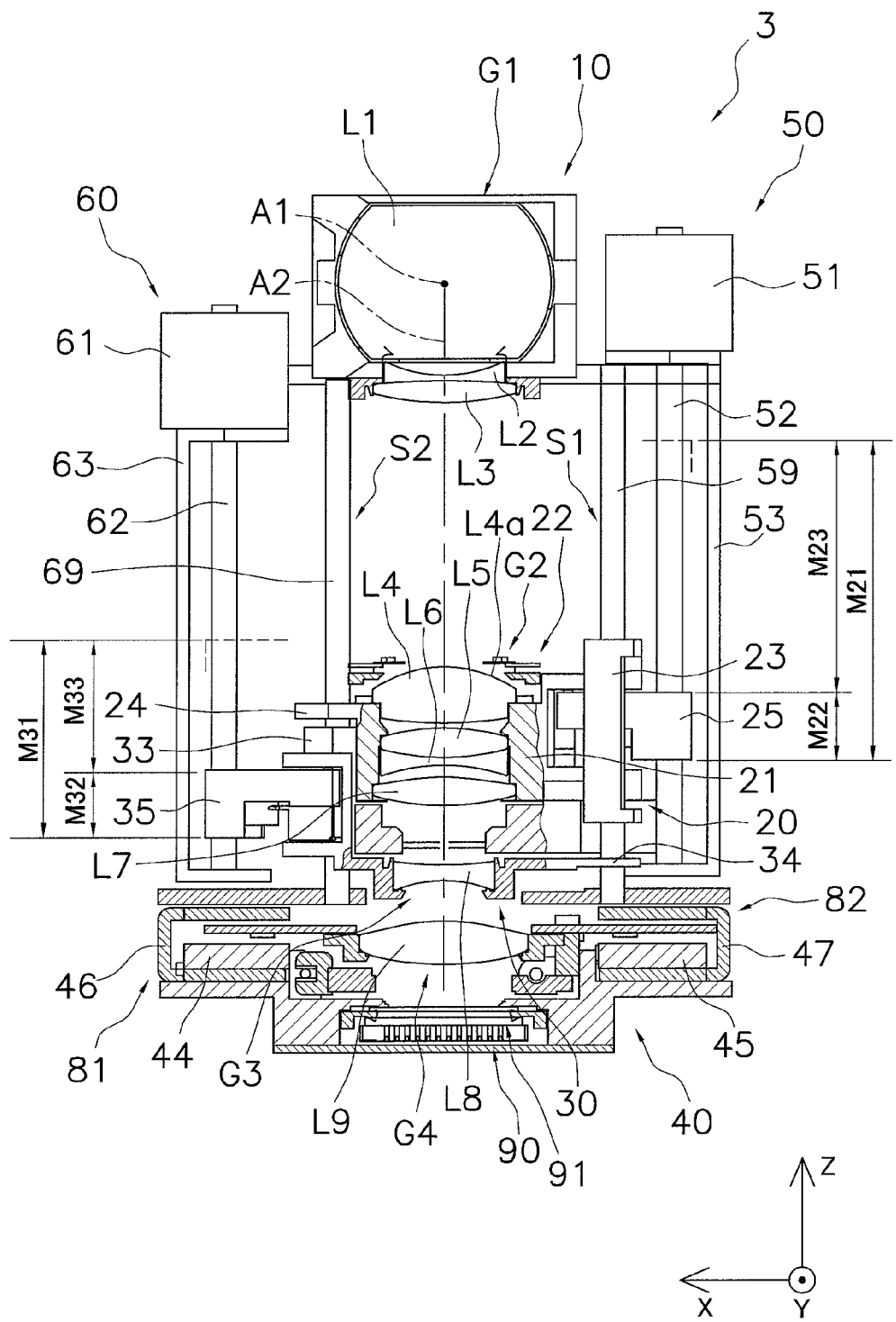
FIG. 10 is a simplified cross section of a lens barrel.
Figure 11:
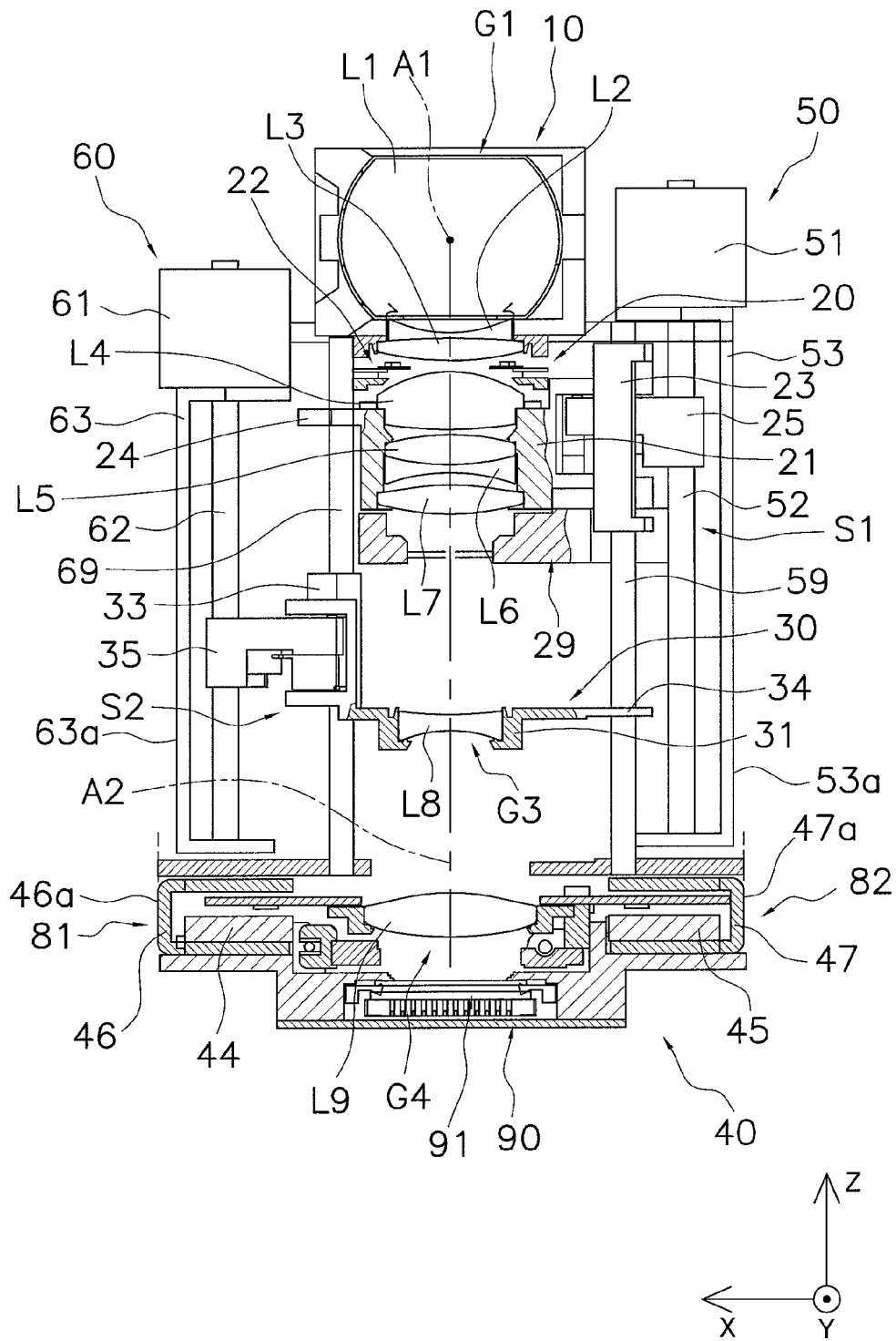
FIG. 11 is a simplified cross section of a lens barrel.
Figure 12:
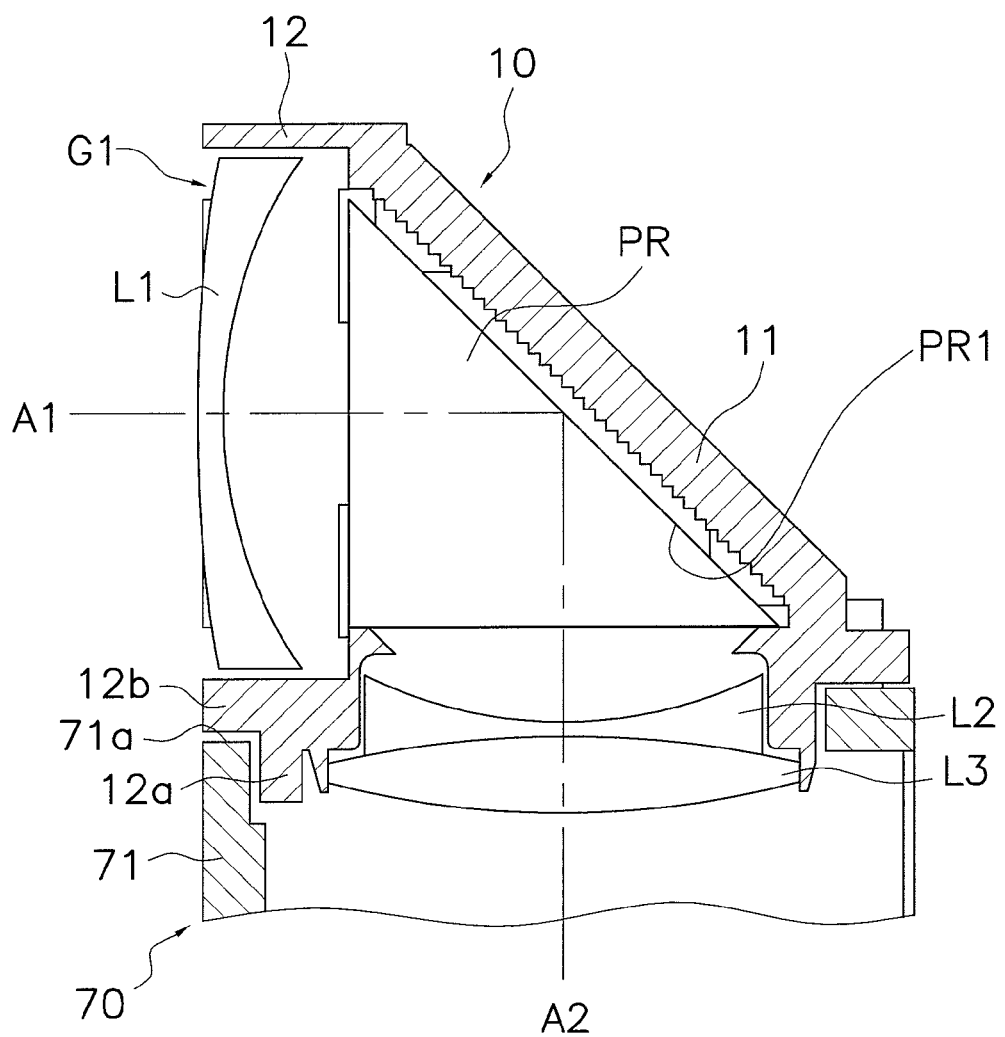
FIG. 12 is a cross section of a first lens group and the surrounding area.
Figure 13:
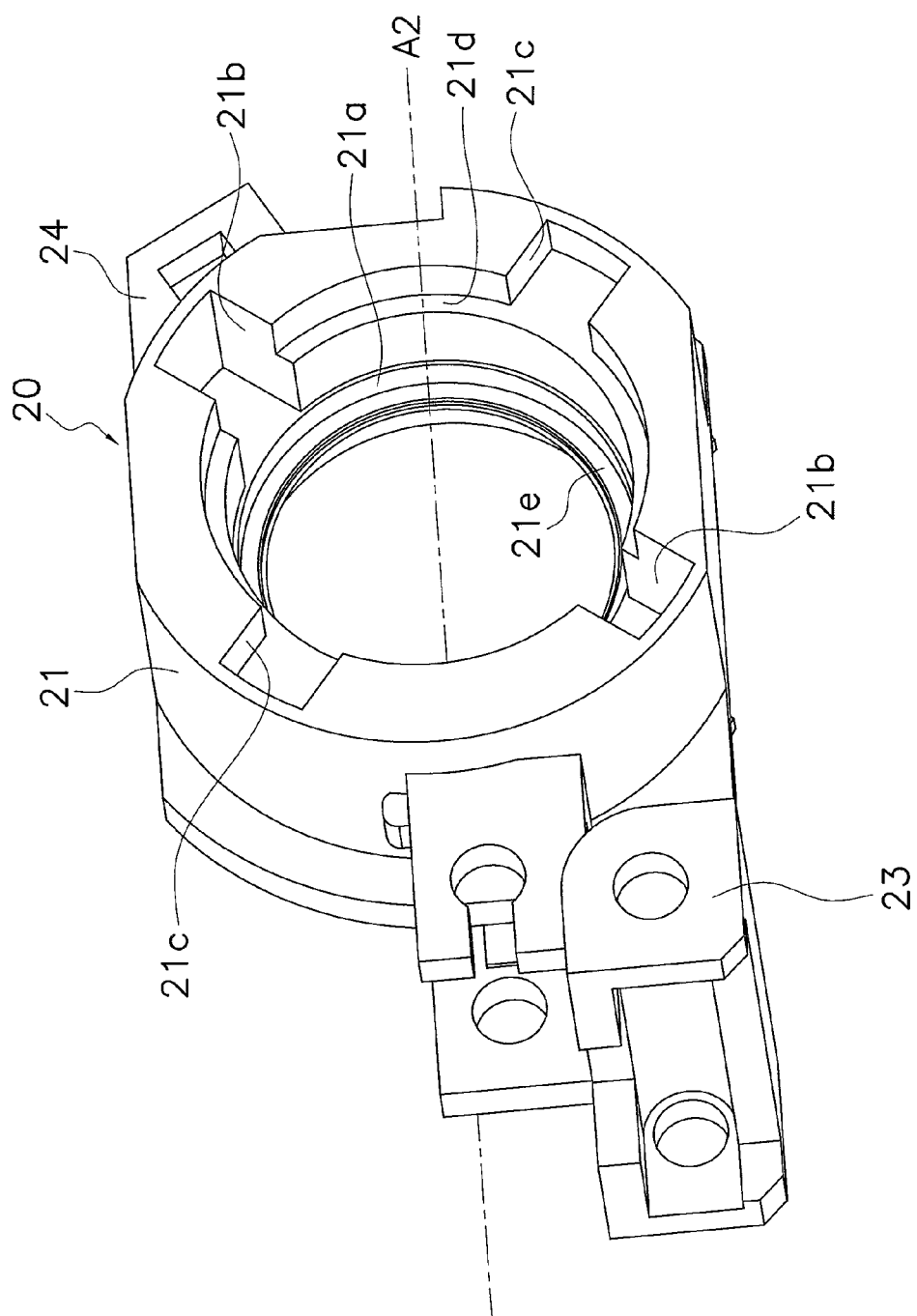
FIG. 13 is a perspective view of a second support frame.
Figure 14B:
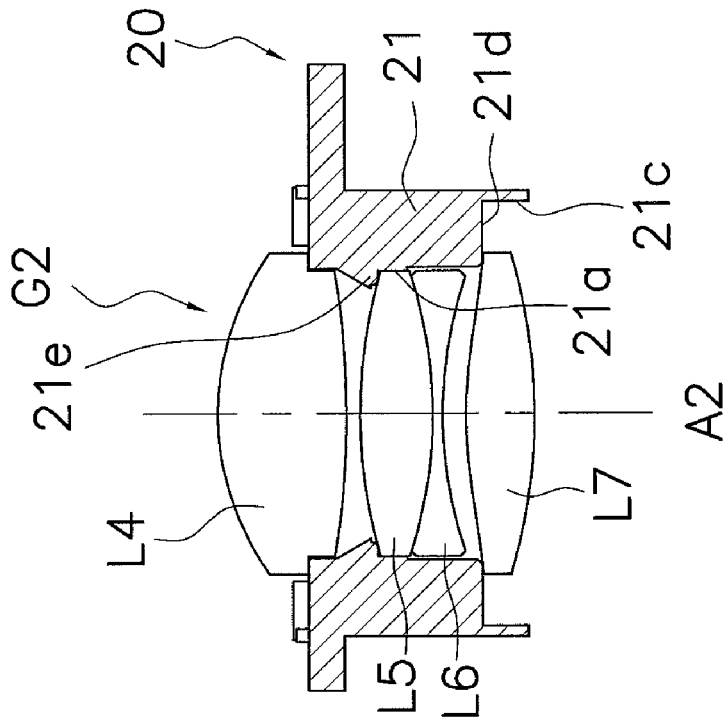
FIGS. 14A and 14B are cross sections of a second lens group and a second support frame.
Figure 14A:
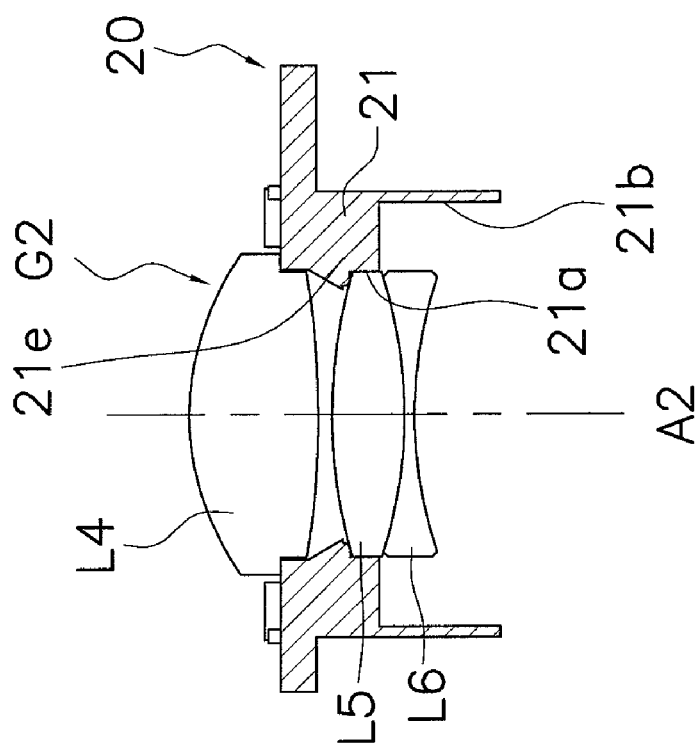
Figure 15A:
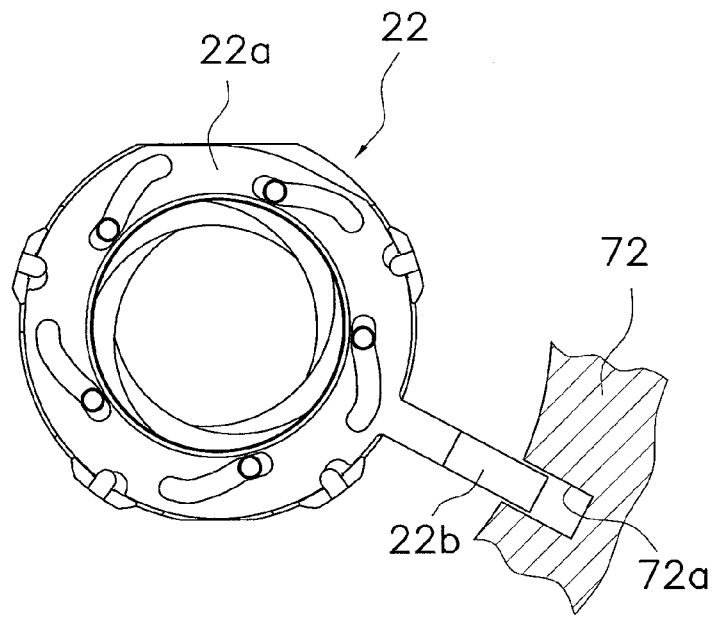
FIGS. 15A and 15B are plan views of an aperture unit.
Figure 15B:
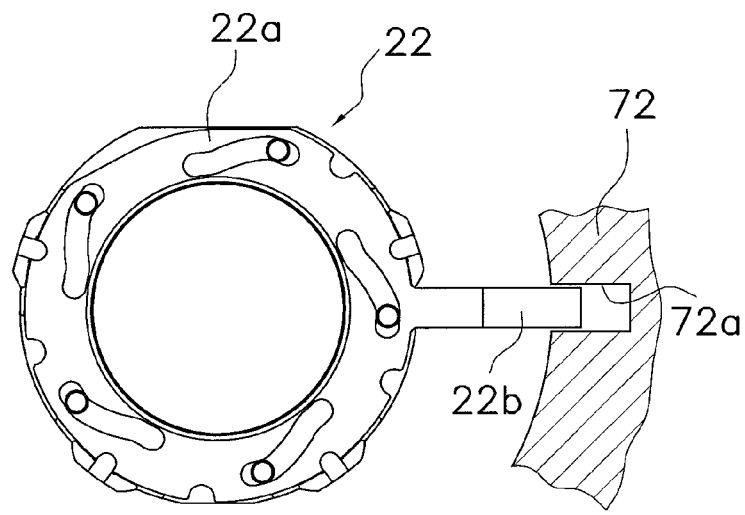

FIG. 9 is a diagram of the configuration of an imaging optical system. FIG. 9 shows a wide angle state. FIGS. 10 and 11 are simplified cross sections of the lens barrel 3. FIG. 10 shows the wide angle state, and FIG. 11 shows a telephoto state. FIG. 12 is a cross section of a first lens group G1 and the surrounding area. FIG. 13 is a perspective view of a second support frame 20. FIGS. 14A and 14B are cross sections of a second lens group G2 and the second support frame 20. In FIG. 14A, a seventh lens L7 is omitted. FIGS. 15A and 15B are plan views of an aperture unit 22. FIG. 15A shows a stopped state, and FIG. 15B shows an open state.

Figure 16:
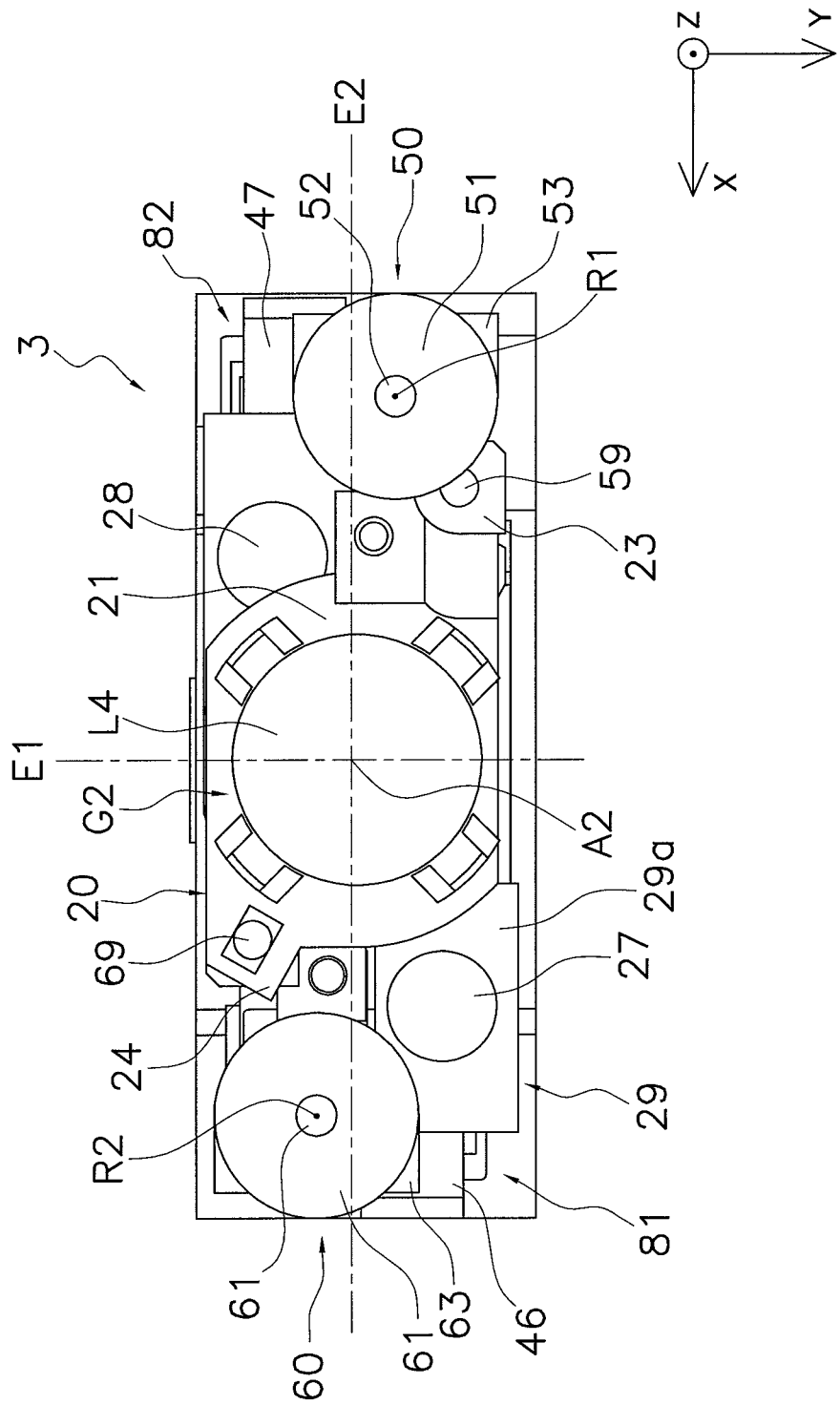
FIG. 16 is a simplified plan view of a lens barrel.
Figure 17:
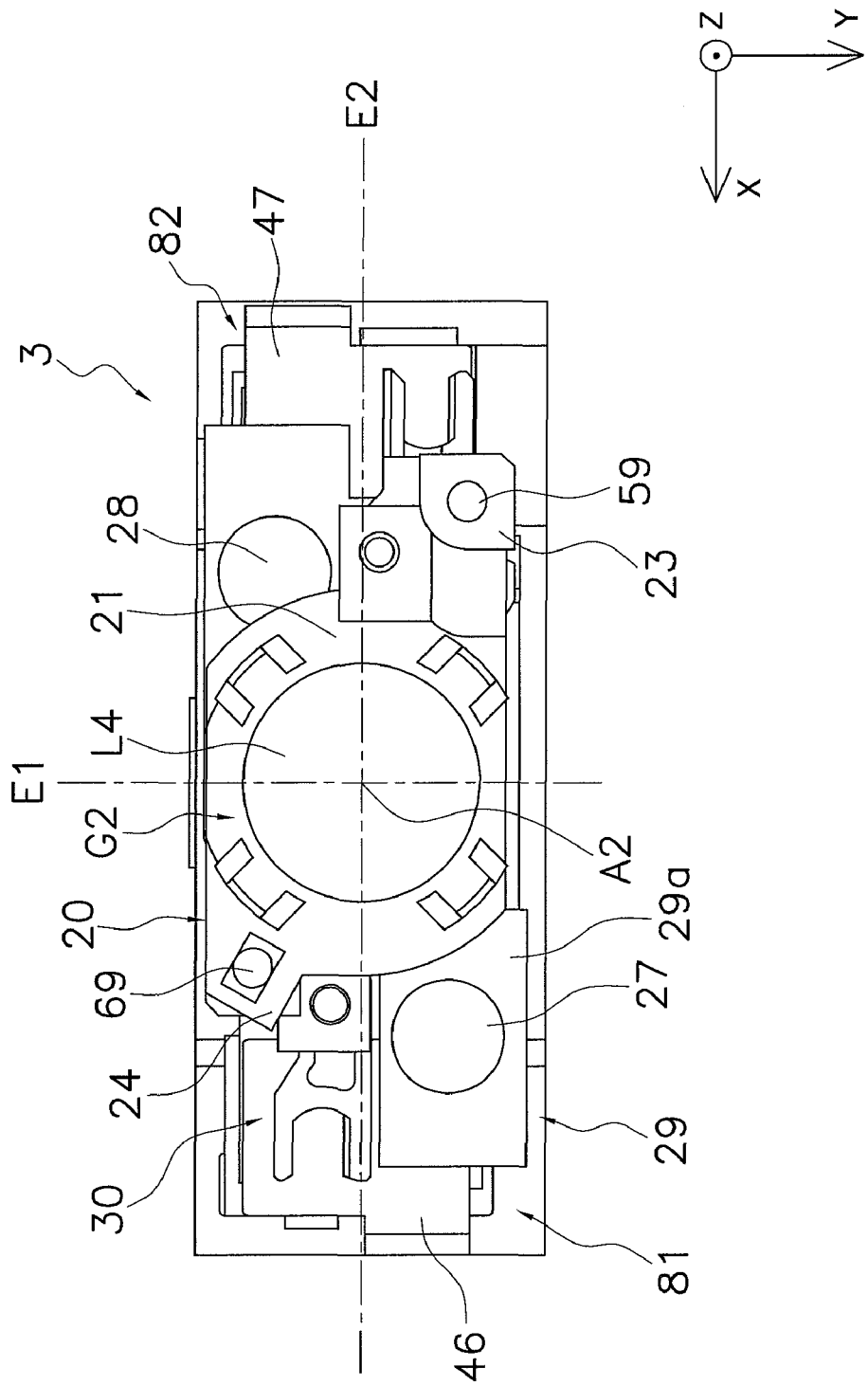
FIG. 17 is a simplified plan view of a lens barrel.
Figure 18:
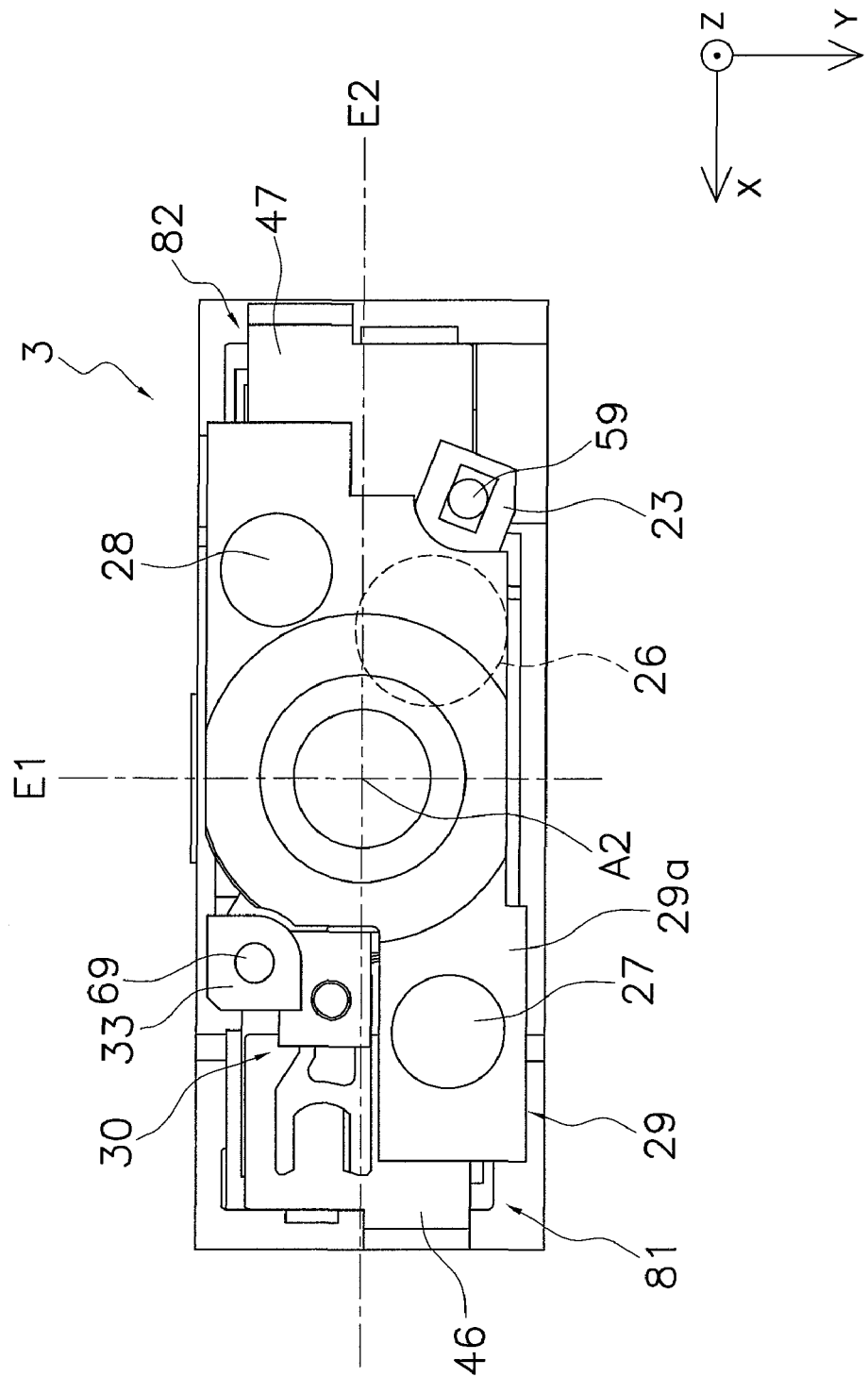
FIG. 18 is a simplified plan view of a lens barrel.
Figure 19:
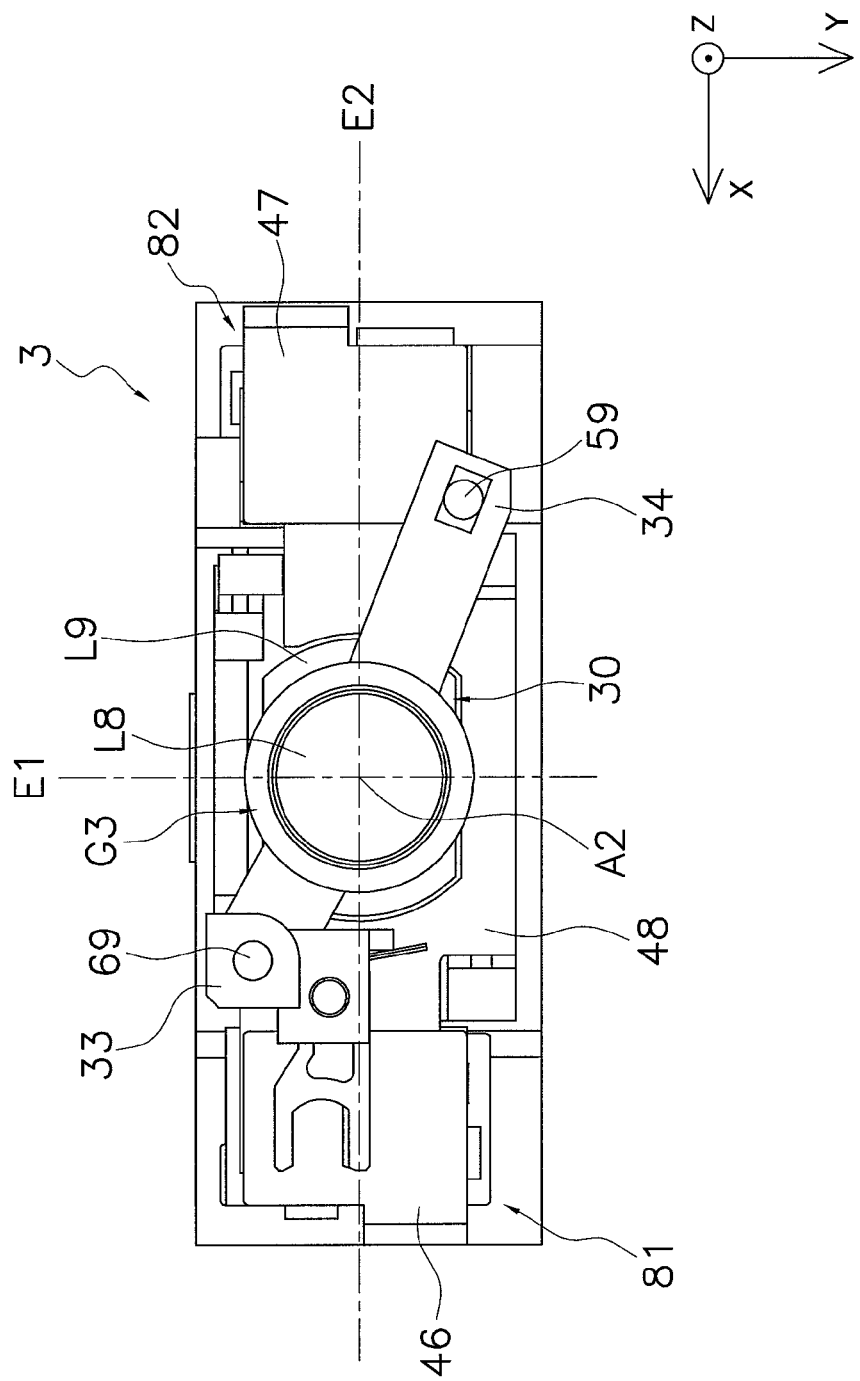
FIG. 19 is a simplified plan view of a lens barrel.
Figure 20:
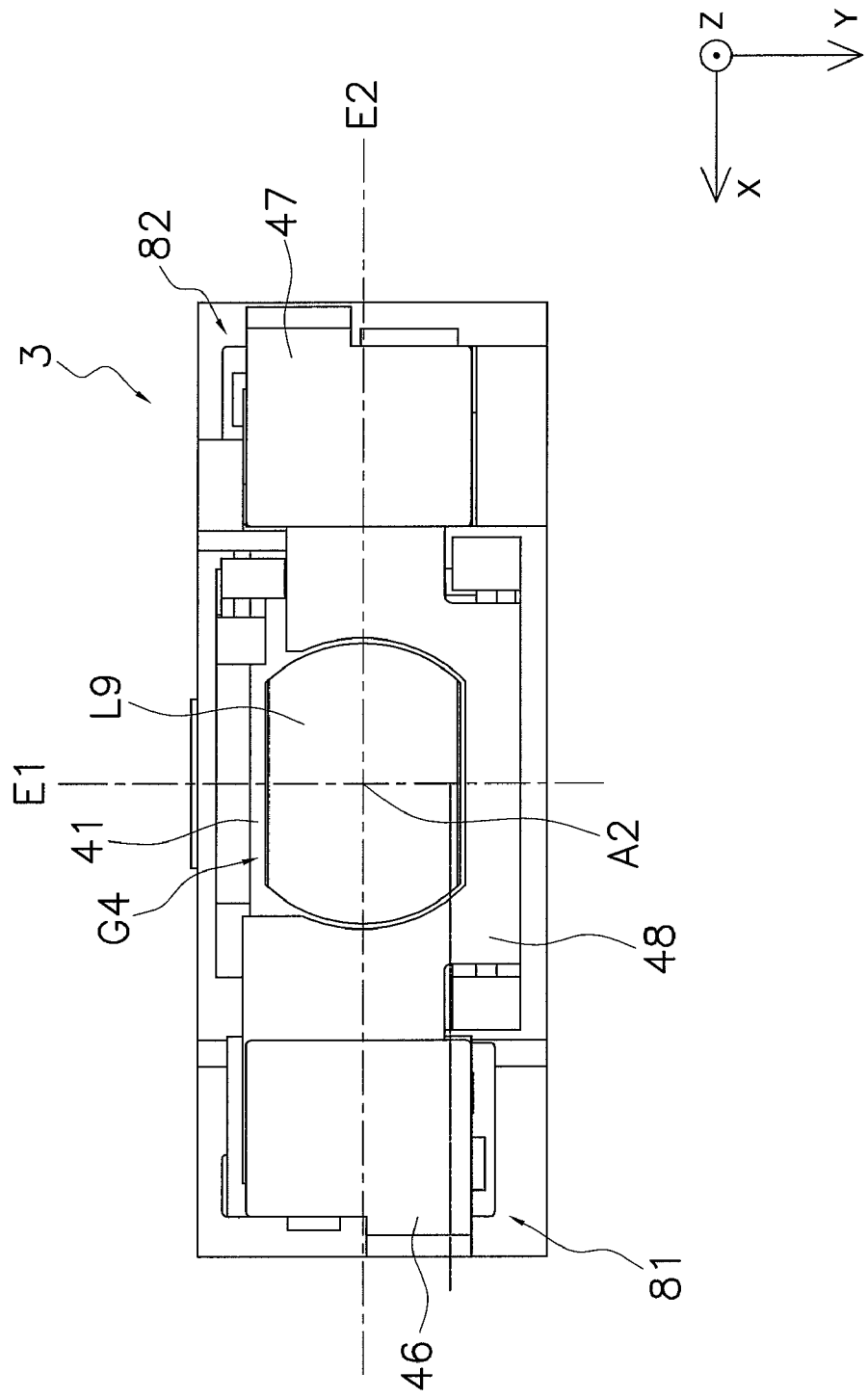
FIG. 20 is a simplified plan view of a lens barrel.
Figure 21:
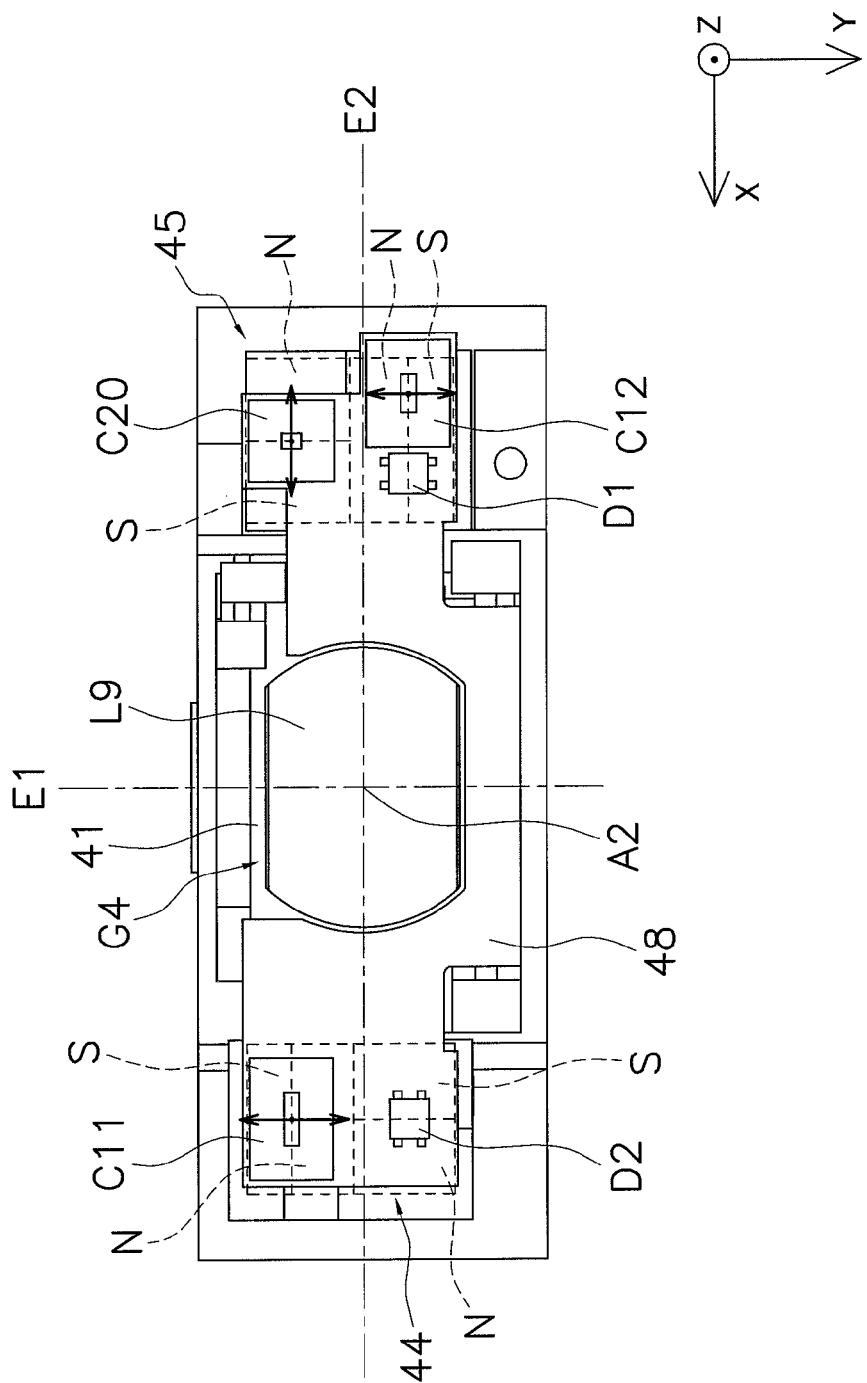
FIG. 21 is a simplified plan view of a lens barrel.

FIGS. 16 to 21 are simplified plan views of the lens barrel 3 as viewed in the Z axial direction. In FIG. 16, a part of the main body frame 70 is omitted. In FIG. 17, a first driving unit 50 and a second driving unit 60 are omitted. In FIG. 18, the second support frame 20 is omitted. In FIG. 19, a shutter unit 29 is omitted. FIG. 20 is a simplified plan view of a lens driving device 40. In FIG. 21, a first yoke 46 and a second yoke 47 are omitted.

As shown in FIGS. 3 to 8, the lens barrel 3 has the imaging optical system (which employs a bending optical system for bending the optical path), a first support frame 10, the second support frame 20, a third support frame 30, the first driving unit 50, the second driving unit 60, the main body frame 70, the aperture unit 22, the shutter unit 29, and the lens driving device 40 (which supports a fourth lens group G4 of the imaging optical system).

(1) Imaging Optical System

As shown in FIG. 9, the imaging optical system has the first lens group G1, the second lens group G2, a third lens group G3, and the fourth lens group G4.

The first lens group G1 is a lens group that overall has negative refractive power, and is provided so as to take in the light beam incident along a first optical axis A1 from the subject. More specifically, the first lens group G1 is supported by the first support frame 10, and has a first lens L1, a prism PR (an example of a bending optical element), a second lens L2, and a third lens L3. The first lens L1 has the first optical axis A1, and the second lens L2 and third lens L3 have a second optical axis A2 that is substantially perpendicular to the first optical axis A1. The prism PR is an internal reflection prism, for example, and has a reflection face PR1 that reflects the light beam incident along the first optical axis A1, in a direction along the second optical axis A2.

The second lens group G2 is a lens group that overall has positive refractive power, and takes in light that has been bent by the first lens group G1. More specifically, the second lens group G2 is supported by the second support frame 20, and has a fourth lens L4, a fifth lens L5, a sixth lens L6, and a seventh lens L7.

The fourth to seventh lenses L4 to L7 are supported by the second support frame 20 so that the optical axes of the fourth to seventh lenses L4 to L7 coincide with the second optical axis A2. The second support frame 20 is provided so as to be capable of moving in a direction along the second optical axis A2 with respect to the main body frame 70, and the fourth to seventh lenses L4 to L7 move integrally in a direction along the second optical axis A2 from the wide angle end toward the telephoto end. Therefore, the second lens group G2 can function as a variable power group for varying the power of the imaging optical system.

The third lens group G3 has an eighth lens L8 that takes in a light beam that has passed through the second lens group G2, and has negative refractive power. The eighth lens L8 is supported by the third support frame 30 so that the optical axis of the eighth lens L8 coincides with the second optical axis A2. The third support frame 30 is provided so as to be capable of moving in a direction along the second optical axis A2 with respect to the main body frame 70, and the eighth lens L8 moves in a direction along the second optical axis A2 from the wide angle end toward the telephoto end. Therefore, the eighth lens L8 can function as a focusing lens.

The fourth lens group G4 has a ninth lens L9 that takes in a light beam that has passed through the third lens group G3, and functions as an image blur correcting lens. The ninth lens L9 is supported by the lens driving device 40 (discussed below; an example of the third driving unit) so as to be capable of moving within a plane that is perpendicular to the second optical axis A2. The optical axis of the fourth lens group G4 faces in substantially the same direction as the second optical axis A2. The fourth lens group G4 does not move in a direction along the second optical axis A2.

The aperture stop of this imaging optical system is always located on the first lens group G1 of the second lens group G2, so the position of this aperture stop moves along the second optical axis A2, from the wide angle end toward the telephoto end, along with the second lens group G2 and the third lens group G3. The aperture unit 22 (a luminous energy adjusting unit) is disposed at the location of this aperture stop. The aperture unit 22 is fixed to the second support frame 20, and moves along with the second lens group G2 in a direction along the second optical axis A2. The aperture unit 22 will be discussed below.

(2) First Support Frame

The imaging optical system described above is supported by various support frames. More specifically, as shown in FIGS. 5 to 8, the first lens group G1 is fixed by adhesive bonding, for example, to the first support frame 10. The first support frame 10 is fixed to the end of the main body frame 70 on the Z axis positive direction side. The first support frame 10 has a first support frame main body 11 and a forward portion 12. As shown in FIG. 12, the prism PR, the second lens L2, and the third lens L3 of the first lens group G1 are fixed to the first support frame main body 11. The first lens L1 is fixed to the forward portion 12.

As shown in FIG. 5, part of the main body frame 70 and the first support frame 10 overlap when viewed in a direction along the first optical axis A1. More specifically, as shown in FIG. 12, the main body frame 70 has a forward plate 71 that is disposed on the Y axis positive direction side of the second lens group G2 and the third lens group G3 and extends in the Z axial direction. The forward portion 12 of the first support frame 10 is disposed on the Z axis positive direction side of the forward plate 71.

The forward portion 12 has a first protrusion 12a that protrudes in a direction along the second optical axis A2, and a second protrusion 12b that protrudes in a direction along the first optical axis A1. The first protrusion 12a is disposed on the Y axis negative direction side of the forward plate 71. The forward plate 71 has a recess 71a that is recessed on the Z axis negative direction side. The second protrusion 12b is inserted into the recess 71a.

(3) Second Support Frame

The second lens group G2 is fixed by adhesive bonding, for example, to the second support frame 20. A first guide shaft 59 and a second guide shaft 69 are fixed to the main body frame 70. The second support frame 20 is supported by the first guide shaft 59 and the second guide shaft 69 so as to be capable of moving along the second optical axis A2.

More specifically, the second support frame 20 has a second support frame main body 21 to which the second lens group G2 is fixed, a first guide portion 23 that slides with the first guide shaft 59, a second guide portion 24 that slides with the second guide shaft 69, and a first drive member 25 that receives the drive force generated by the first driving unit 50. The second support frame 20, the first guide shaft 59, and the second guide shaft 69 constitute a first support mechanism 51 for movably supporting the second lens group G2. The second support frame 20 is guided mainly by the first guide shaft 59. The second guide shaft 69 prevents the second support frame 20 from rotating around the first guide shaft 59.

As shown in FIG. 13, the second support frame main body 21 is cylindrical in shape, and has an opening 21a, two first bonding grooves 21b for bonding the fifth lens L5, and two second bonding grooves 21c for bonding the seventh lens L7. The first bonding grooves 21b are disposed flanking the second optical axis A2. The two second bonding grooves 21c are also disposed flanking the second optical axis A2. The first bonding grooves 21b and second bonding grooves 21c are disposed alternately at a constant pitch in the circumferential direction.

The first bonding grooves 21b are formed deeper than the second bonding grooves 21c, and as shown in FIG. 14A, they extend in a direction along the second optical axis A2 to the outer peripheral side of the fifth lens L5. The outer peripheral face of the fifth lens L5 is mated to the opening 21a. An annular ridge 21e is formed on the fourth lens L4 side of the opening 21a. The fifth lens L5 comes into contact with the annular ridge 21e, and this annular ridge 21e positions the fifth lens L5 with respect to the second support frame 20 in a direction along the second optical axis A2. The sixth lens L6 is joined on the seventh lens L7 side of the fifth lens L5. The first bonding grooves 21b are filled with an adhesive (not shown), which fixes the fifth lens L5 to the second support frame 20.

Meanwhile, the second bonding grooves 21c are formed shallower than the first bonding grooves 21b, and as shown in FIG. 14B, they do not extend all the way to the outer peripheral side of the fifth lens L5. The seventh lens L7 comes into contact with an annular face 21d, and this annular face 21d positions the seventh lens L7 with respect to the second support frame 20 in a direction along the second optical axis A2. The second bonding grooves 21c are filled with an adhesive (not shown), and this fixes the seventh lens L7 to the second support frame 20.

(4) First Driving Unit

The second support frame 20 is driven by the first driving unit 50. More specifically, the first driving unit 50 has a first drive motor 51, a first lead screw 52 (an example of a first drive shaft) that is rotationally driven by the first drive motor 51, and a first frame 53 that supports the first drive motor 51 and the first lead screw 52.

The first drive member 25 threads onto the first lead screw 52. The first drive member 25 is supported by the second support frame main body 21 so as to be rotatable and to move integrally in the axial direction. With this configuration, when the first lead screw 52 turns, the second support frame 20 moves along the second optical axis A2.

(5) Aperture Unit and Shutter Unit

The aperture unit 22 and the shutter unit 29 are fixed to the second support frame 20. The aperture unit 22 is fixed on the first lens group G1 side of the second support frame 20, and the shutter unit 29 is fixed on the imaging unit 90 side of the second support frame 20 (the opposite side from the first lens group G1 side).

The aperture unit 22 has an aperture mechanism 22a (an example of an aperture member) with which the rotational force around the second optical axis A2 can be utilized to adjust the aperture, and a drive lever 22b provided so as to be capable of transmitting rotational force to the aperture mechanism 22a. As shown in FIG. 10, part of the convex face L4a of the fourth lens L4 is disposed within the opening of the aperture mechanism 22a. That is, when viewed in a direction along the first optical axis A1, part of the fourth lens L4 goes inside the aperture unit 22, and part of the fourth lens L4 overlaps the aperture unit 22.

As shown in FIG. 4, the main body frame 70 has a guide portion 72 with which the linear motion of the second support frame 20 with respect to the main body frame 70 in a direction along the second optical axis A2 is converted into rotary motion of the drive lever 22b around the second optical axis A2. More specifically, as shown in FIGS. 4, 15A, and 15B, the drive lever 22b extends from the aperture mechanism 22a in a direction that is perpendicular to the second optical axis A2. FIG. 15A shows a state in which the aperture unit 22 has been stopped, while FIG. 15B shows a state in which the aperture unit 22 has been opened.

The guide portion 72 has a guide groove 72a into which the drive lever 22b is inserted. The guide groove 72a slants in a direction along the second optical axis A2. When the second support frame 20 moves along the second optical axis A2, the drive lever 22b moves through the guide groove 72a, and the drive lever 22b rotates around the second optical axis A2 with respect to the second support frame 20. This allows the drive of the aperture mechanism 22a to be performed by the first driving unit 50.

The shutter unit 29 has a shutter mechanism 29a provided so that the optical path along the second optical axis A2 can be opened or blocked off, and a shutter drive motor 27 that drives the shutter mechanism 29a. The shutter drive motor 27 is disposed more to the first lens group G1 side than the shutter mechanism 29a in a direction along the second optical axis A2.

Further, the shutter unit 29 is provided with a neutral density filter 26 (an example of an optical element; see FIG. 18) provided so as to be capable of being inserted into the optical path along the second optical axis A2 and being retracted from the optical path, and a filter drive motor 28 (an example of an element drive motor) that drives the neutral density filter 26. The filter drive motor 28 is disposed more to the first lens group G1 side than the neutral density filter 26 in a direction along the second optical axis A2.

(6) Third Support Frame

As shown in FIGS. 5 to 11, the third lens group G3 is fixed to the third support frame 30 by adhesive bonding, for example. The third support frame 30 is supported movably along the second optical axis A2 by the first guide shaft 59 and the second guide shaft 69. More specifically, the third support frame 30 has a third support frame main body 31 to which the third lens group G3 is fixed, a third guide portion 33 that slides with the second guide shaft 69, a fourth guide portion 34 that slides with the first guide shaft 59, and a second drive member 35 that receives the drive force generated by the second driving unit 60.

The third support frame 30, the first guide shaft 59, and the second guide shaft 69 constitute a second support mechanism S2 for movably supporting the third lens group G3. The third support frame 30 is mainly guided by the second guide shaft 69. The first guide shaft 59 prevents the third support frame 30 from rotating around the second guide shaft 69.

(7) Second Driving Unit

The third support frame 30 is driven by the second driving unit 60. More specifically, the second driving unit 60 has a second drive motor 61, a second lead screw 62 (an example of a second drive shaft) that is rotationally driven by the second drive motor 61, and a second frame 63 that supports the second drive motor 61 and the second lead screw 62. The second drive member 35 is threaded onto the second lead screw 62. The second drive member 35 is supported by the third support frame main body 31 so as to be rotatable and to move integrally in the axial direction. With this configuration, when the second lead screw 62 turns, the third support frame 30 moves along the second optical axis A2.

(8) Lens Driving Device

The lens driving device 40 is disposed on the Z axis negative direction side of the main body frame 70, and the fourth lens group G4 is supported by this lens driving device 40 so as to be capable of moving within a plane that is perpendicular to the second optical axis A2. More specifically, the lens driving device 40 has a base plate 43, a fifth support frame 42 that is supported movably in the Y axis direction by the base plate 43, a fourth support frame 41 that is supported movably in the X axis direction by the fifth support frame 42, and an electrical board 48 fixed to the fourth support frame 41. The base plate 43 is fixed to the main body frame 70 by a fixing member (not shown), for example.

Further, the lens driving device 40 has a first coil C11, a second coil C12, a third coil C20, a first magnet 44, a second magnet 45, a first yoke 46, and a second yoke 47. The first coil C11 and the second coil C12 are used to drive the fourth support frame 41 in the pitch direction (Y axis direction), and are disposed at the X axial ends of the electrical board 48 so as to flank the second optical axis A2. The third coil C20 is used to drive the fourth support frame 41 in the yaw direction (X axis direction), and is disposed on the Y axis negative direction side of the second coil C12.

The first yoke 46 and the second yoke 47 are fixed to the base plate 43. The first magnet 44 is fixed to the first yoke 46 so as to be opposite the first coil C11 in the Z axis direction, and the second magnet 45 is fixed to the second yoke 47 so as to be opposite the third coil C20 in the Z axis direction.

The lens driving device 40 has a pitch position sensor D1 and a yaw position sensor D2. The pitch position sensor D1 is used to detect the position of the fourth support frame 41 in the pitch direction. The yaw position sensor D2 is used to detect the position of the fourth support frame 41 in the yaw direction. The pitch position sensor D1 and the yaw position sensor D2 allow the position of the fourth support frame 41 to be detected.

As shown in FIG. 21, the portion of the first magnet 44 corresponding to the first coil C11 is subjected to dipolar magnetization so as to line up in the Y axis direction. The portion of the first magnet 44 corresponding to the second coil C12 is subjected to dipolar magnetization so as to line up in the X axis direction. The portion of the second magnet 45 corresponding to the second coil C12 and the pitch position sensor D1 is subjected to dipolar magnetization so as to line up in the Y axis direction. The portion of the second magnet 45 corresponding to the third coil C20 is subjected to dipolar magnetization so as to line up in the X axis direction.

As discussed above, the first coil C11, the second coil C12, the first magnet 44, the second magnet 45, the first yoke 46, and the second yoke 47 constitute a pitch driving unit 81 that drives the fourth support frame 41 in the pitch direction. The third coil C20, the second magnet 45, and the second yoke 47 constitute a yaw driving unit 82 that drives the fourth support frame 41 in the yaw direction.

Movement Region of Second and Third Support Frames

The region of movement of the second support frame 20 and the third support frame 30 will now be described.

As shown in FIG. 10, the second support frame 20 moves from the wide angle end to the telephoto end of the imaging optical system, within the range of a first stroke M23, along the second optical axis A2. In FIG. 10, the first stroke M23 is shown using the first drive member 25 as a reference. If we let a first dimension M22 be the dimension of the first drive member 25 in a direction along the second optical axis A2, then the region occupied by the first drive member 25 within the range from the wide angle end to the telephoto end is a first movement region M21.

Meanwhile, the third support frame 30 moves from the wide angle end to the telephoto end, within the range of a second stroke M33, along the second optical axis A2. In FIG. 10, the second stroke M33 is shown using the second drive member 35 as a reference. If we let a second dimension M32 be the dimension of the second drive member 35 in a direction along the second optical axis A2, then the region occupied by the second drive member 35 within the range from the wide angle end to the telephoto end is a second movement region M31.

It can be seen from FIG. 10 that the first movement region M21 partially overlaps the second movement region M31. Further, the first stroke M23 partially overlaps the second stroke M33. As a result, the size of the lens barrel 3 can be reduced in a direction along the second optical axis A2.

Features of Layout

The layout of the constituent components of the lens barrel 3 has the following features. Specifically, when viewed in a direction along the second optical axis A2, the first driving unit 50 and the second driving unit 60 are disposed flanking the second optical axis A2. In more specific terms, as shown in FIGS. 16 to 21, when a first boundary E1 is set extending in the Y axis direction and intersecting the second optical axis A2, the first driving unit 50 and the second driving unit 60 are disposed on both sides, flanking the first boundary E1. The first driving unit 50 is disposed at the end of the lens barrel 3 on the X axis negative direction side, and the second driving unit 60 is disposed at the end of the lens barrel 3 on the X axis positive direction side.

When a second boundary E2 is set extending in the X axis direction and intersecting the second optical axis A2, the first driving unit 50 and the second driving unit 60 are disposed on both sides, flanking the second boundary E2. In more specific terms, a first rotational center R1 of the first lead screw 52 of the first driving unit 50 is disposed more to the Y axis positive direction side than the second optical axis A2. A second rotational center R2 of the second lead screw 62 of the second driving unit 60 is disposed more to the Y axis negative direction side than the second optical axis A2. The second optical axis A2 is disposed near or on a line connecting the first rotational center R1 and the second rotational center R2. The first guide shaft 59 is disposed near the first driving unit 50. The second guide shaft 69 is disposed near the second driving unit 60.

Also, the first driving unit 50 and/or the second driving unit 60 overlaps the lens driving device 40. In more specific terms, the first driving unit 50 overlaps the yaw driving unit 82, and the second driving unit 60 overlaps the pitch driving unit 81.

Further, as shown in FIGS. 5 and 6, the outer end of the first driving unit 50 on the opposite side from the second optical axis (more specifically, a first outer end face 53a of the first frame 53) is disposed at substantially the same position (the position in the X axis direction) as the outer end of the yaw driving unit 82 on the opposite side from the second optical axis A2.

The outer end of the second driving unit 60 on the opposite side from the second optical axis (more specifically, a third outer end face 63a of the second frame 63) is disposed at substantially the same position (the position in the X axis direction) as the outer end of the pitch driving unit 81 on the opposite side from the second optical axis A2.

As shown in FIGS. 5 and 6, the first drive motor 51 is disposed closer to the first lens group G1 than the second drive motor 61 in a direction along the second optical axis A2. The first drive motor 51 is disposed more to the Z axis positive direction side than the second drive motor 61. The first drive motor 51 is disposed to the side in the X axis direction of the first support frame 10 and the first lens group G1.

As shown in FIGS. 5 to 21, the shutter drive motor 27 and the filter drive motor 28 are disposed flanking the second optical axis A2. More specifically, the first guide shaft 59 and the second guide shaft 69 are disposed flanking the first boundary E1. When viewed in a direction along the second optical axis A2, the first guide shaft 59 and the second guide shaft 69 are disposed flanking the second optical axis A2. When viewed in a direction along the second optical axis A2, the first guide shaft 59 is disposed near the filter drive motor 28, and the second guide shaft 69 is disposed near the shutter drive motor 27.

To summarize the above layout, the first driving unit 50, the first guide shaft 59, and the filter drive motor 28 are disposed on the X axis negative direction side of the first boundary E1, and the second driving unit 60, the second guide shaft 69, and the shutter drive motor 27 are disposed on the X axis positive direction side of the first boundary E1.

Also, the first driving unit 50, the first guide shaft 59, and the shutter drive motor 27 are disposed on the Y axis positive direction side of the second boundary E2, and the second driving unit 60, the second guide shaft 69, and the filter drive motor 28 are disposed on the Y axis negative direction side of the second boundary E2.

Operation of Digital Camera

The operation of the digital camera 1 will be described. The basic operation of the digital camera 1 will be skipped, since it is no different from the basic operation of a conventional camera.

(1) Zoom Operation During Imaging

With the power on, the imaging optical system is set to the wide angle end (the state shown in FIG. 10), for example. When the zoom adjusting lever 7 is turned to the telephoto side, the second support frame 20 and the third support frame 30 are driven in a direction along the second optical axis A2 by the first driving unit 50 and the second driving unit 60 according to the rotational angle and operation time of the zoom adjusting lever 7. More specifically, when the first lead screw 52 is rotationally driven by the first drive motor 51 of the first driving unit 50, the second support frame 20 moves along the second optical axis A2 to the first lens group G1 side (see FIG. 11, for example). When the second lead screw 62 is rotationally driven by the second drive motor 61 of the second driving unit 60, the third support frame 30 moves along the second optical axis A2 to the first lens group G1 side (see FIG. 11, for example). The second support frame 20 moves linearly from the wide angle end to the telephoto end, but the third support frame 30 turns back to the imaging unit 90 side midway, and again moves to the first lens group G1 side.

When the zoom adjusting lever 7 is turned to the wide angle side, the second support frame 20 is driven to the imaging unit 90 side by the first driving unit 50 according to the rotational angle and operation time of the zoom adjusting lever 7, and the third support frame 30 is driven to the imaging unit 90 side by the second driving unit 60.

Thus, when the second lens group G2 and the third lens group G3 move along the second optical axis A2, the magnification ratio of the imaging optical system increases.

(2) Operation of Aperture Unit

The drive lever 22b is provided to the aperture unit 22 fixed to the second support frame 20, and the end of the drive lever 22b is inserted into the guide groove 72a formed in the guide portion 72 of the main body frame 70. Accordingly, when the second support frame 20 moves along the second optical axis A2, as shown in FIGS. 15A and 15B, the drive lever 22b is guided by the guide groove 72a so as to rotate around the second optical axis A2. As a result, the aperture unit 22 changes between the stopped state shown in FIG. 15A and the open state shown in FIG. 15B, and the luminous energy is adjusted by the aperture unit 22 of the imaging optical system.

(3) Operation of Lens Driving Device

The fourth lens group G4 is driven by the lens driving device 40 according to the amount of shake in the pitch and yaw directions detected by a shake detection sensor. More specifically, the amount of drive of the fourth lens group G4 in the pitch and yaw directions is calculated by a control unit (not shown) on the basis of the shake amount and positional information detected by a position sensor. Current corresponding to this drive amount is supplied to the first coil C11, the second coil C12, and the third coil C20. As a result, the fourth support frame 41 is driven in the pitch and yaw directions, and the optical path is adjusted by the fourth lens group G4 so that there will be no blurring of the image. This allows the position of the optical image of the subject to be adjusted according to the shaking of the digital camera 1, so image blur can be corrected.

Features of Lens Barrel

Features of the lens barrel 3 are as follows.

(1)

With this lens barrel 3, the first lens group G1 has an overall negative refractive power, which is advantageous in terms of achieving a wider angle, as compared to when the overall refractive power is positive, for example.

In addition, since part of the first movement region M21 in which the second support frame 20 moves overlaps with the second movement region M31 in which the third support frame 30 moves, the length of the lens barrel 3 in a direction along the second optical axis A2 can be reduced.

Thus, this lens barrel 3 has a wider angle and is more compact.

(2)

Since the first driving unit 50 and the second driving unit 60 are disposed flanking the second optical axis A2, when viewed in a direction along the second optical axis A2, the overall lens barrel 3 is longer in the X axis direction and shorter in the Y axis direction. This affords a lens barrel 3 that is thinner.

(3)

When viewed in a direction along the second optical axis A2, the first driving unit 50 overlaps the yaw driving unit 82, and the second driving unit 60 overlaps the pitch driving unit 81. Therefore, the pitch driving unit 81 and the yaw driving unit 82 protrudes less in a direction (such as the Y axis direction) that is different from the direction in which the first driving unit 50 and the second driving unit 60 are aligned. This means that the lens barrel 3 can be shorter in the Y axis direction, affording a thinner lens barrel 3.

(4)

When viewed in a direction along the second optical axis A2, the first outer end face 53a of the first frame 53 of the first driving unit 50 is disposed at substantially the same position in the X axis direction as the outer end face 47a of the second yoke 47 of the yaw driving unit 82. Therefore, it is less likely that there will be wasted space formed in the portion to the side of the lens barrel 3 on the side where the first driving unit 50 is disposed. This means that the various units can be disposed more efficiently, and the lens barrel 3 can be even more compact.

In particular, with this lens barrel 3, the first driving unit 50 and the yaw driving unit 82 are disposed at the end of the camera main body 2 on the X axis negative direction side, so layout efficiency is higher.

Also, if there is some extra space around the yaw driving unit 82, a larger driving unit can be employed as the yaw driving unit 82, which means that the lens barrel 3 can be made smaller while achieving a more stable drive state for the fourth lens group G4.

The state here in which "the first outer end face 53a is disposed at substantially the same position as the second outer end face 47a of the yaw driving unit 82" encompasses not only a state in which the first outer end face 53a and the second outer end face 47a are disposed at exactly the same position, but also a state in which the first outer end face 53a and the second outer end face 47a are shifted to the extent that a reduction in the size of the lens barrel 3 can still be achieved.

(5)

Also, when viewed in a direction along the second optical axis A2, the third outer end face 63a of the second frame 63 of the second driving unit 60 is disposed at substantially the same position as the fourth outer end face 46a of the first yoke 46 of the pitch driving unit 81. Therefore, it is less likely that there will be wasted space formed in the portion to the side of the lens barrel 3 on the side where the 60 is disposed. This means that the various units can be disposed more efficiently, and the lens barrel 3 can be even more compact.

Also, if there is some extra space around the pitch driving unit 81, a larger driving unit can be employed as the pitch driving unit 81, which means that the lens barrel 3 can be made smaller while achieving a more stable drive state for the fourth lens group G4.

The state here in which "the third outer end face 63a of the second driving unit 60 is disposed at substantially the same position as the fourth outer end face 46a of the pitch driving unit 81" encompasses not only a state in which the third outer end face 63a and the fourth outer end face 46a are disposed at exactly the same position, but also a state in which the third outer end face 63a and the fourth outer end face 46a are shifted to the extent that a reduction in the size of the lens barrel 3 can still be achieved.

(6)

The first drive motor 51 is disposed on the first lens group G1 side of the second support frame 20, and the second drive motor 61 is disposed on the first lens group G1 side of the third support frame 30. Therefore, the space around the first lens group G1 can be utilized more effectively, and the size of the lens barrel 3 can be reduced in a direction along the second optical axis A2.

In particular, when another fourth lens group G4 and the lens driving device 40 are disposed on the opposite side of the third lens group G3 from the first lens group G1, the lens driving device 40 will be less likely to be affected by changes in the magnetic field caused by the first drive motor 51 and the second drive motor 61, and drive of the lens driving device 40 will be less likely to be hindered.

(7)

Since the first drive motor 51 is disposed closer to the first lens group G1 than the second drive motor 61, the second lens group G2, which is driven by the first drive motor 51, can be moved closer to the first lens group G1. The space on the Z axis positive direction side of the second drive motor 61 can also be utilized more effectively.

(8)

When viewed in a direction along the second optical axis A2, part of the main body frame 70 overlaps the first support frame 10, so it is less likely that part of the light incident on the first lens group G1 from a direction along the second optical axis A2 will leak into the interior from the gap formed between the first support frame 10 and the main body frame 70. That is, with this lens barrel 3, there is less of a decrease in optical performance. In particular, since the above-mentioned features are obtained when viewed from the front face, it is even less likely that part of the light incident from the front face side (that is, from the subject side) will leak into the interior from the gap formed between the first support frame 10 and the main body frame 70.

Also, since the first protrusion 12a of the first support frame 10 overlaps the Z axis positive direction end of the forward plate 71 of the main body frame 70 in the Y axis direction, the leakage of light into the interior of the barrel can be reduced with a simple configuration.

Furthermore, since the second protrusion 12b of the first support frame 10 is inserted into the recess 71a of the forward plate 71, the end of the forward plate 71 can be covered by the second protrusion 12b, and this further reduces the entrance of stray light.

(9)

With the lens driving device 40, since the electrical board 48 (which functions as a driven member) is disposed on the first lens group G1 side of the fourth support frame 41, the positions of the pitch driving unit 81 and the yaw driving unit 82 move to the first lens group G1 more than when the disposition is on the opposite side from the first lens group G1 side. Accordingly, space can be ensured at both ends in the X axis direction and on the Z axis negative direction side of the lens driving device 40. This space can be effectively utilized in the fixing of the lens barrel 3 to the camera main body 2. For example, screws or other such fixing members can be disposed in this space. This improves the layout efficiency of the lens driving device 40.

Also, the positions of the pitch driving unit 81 and the yaw driving unit 82 are closer to the third support frame 30, so the overall layout efficiency of the lens barrel 3 is also improved.

(10)

Since the aperture unit 22 and the shutter unit 29 are fixed to the second support frame 20, this means that the second support frame 20, the aperture unit 22, and the shutter unit 29 can share the first driving unit 50, so there is no need to provide a separate driving device for the aperture unit 22 and the shutter unit 29. This allows the lens barrel 3 to have a simpler configuration and lowers the manufacturing cost.

(11)

Since the aperture unit 22 is disposed on the first lens group G1 side of the second support frame 20, the first lens group G1 (and particularly the prism PR) can be smaller, and the lens barrel 3 can be more compact.

(12)

Since the shutter unit 29 is disposed on the opposite side of the second support frame 20 from the first lens group G1 side, the second lens group G2 can move closer to the first lens group G1. This affords a better variable power ratio, and allows a lens barrel 3 that is smaller and higher in power to be obtained.

(13)

Since the shutter drive motor 27 is disposed more to the first lens group G1 side than the shutter mechanism 29a in a direction along the second optical axis A2, this prevents the shutter drive motor 27 from interfering with the lens driving device 40. In other words, the space on the first lens group G1 side of the shutter mechanism 29a can be used more effectively. This allows the lens barrel 3 to be more compact.

(14)

Since the main body frame 70 has the guide portion 72, when the second support frame 20 moves linearly in a direction along the second optical axis A2, the guide groove 72a of the guide portion 72 causes the drive lever 22b to rotate around the second optical axis A2, and this rotational force acts on the aperture mechanism 22a. Therefore, the first driving unit 50 can be utilized to open and close the aperture unit 22, so a driving device for the aperture unit 22 can be omitted. This simplifies the configuration of the lens barrel 3, allows it to be more compact, and lowers its manufacturing cost.

(15)

Since at least part of the convex face L4a of the fourth lens L4 is disposed inside the opening of the aperture unit 22, the aperture unit 22 can be disposed closer to the fourth lens L4. This shortens the overall length of the fourth lens L4 and the aperture unit 22, and reduces the size of the lens barrel 3. This also allows the second lens group G2 to move closer to the first lens group G1. As a result, a higher magnification ratio can be obtained, and the lens barrel 3 will be smaller and have higher power.

(16)

When viewed in a direction along the second optical axis A2, the shutter drive motor 27 and the filter drive motor 28 are disposed flanking the second optical axis A2, so the shutter unit 29 is longer in the X axis direction, and the shutter unit 29 is shorter in the Y axis direction. This means that a thinner lens barrel 3 can be obtained.

(17)

When viewed in a direction along the second optical axis A2, the first guide shaft 59 and the second guide shaft 69 are disposed flanking the second optical axis A2, so the lens barrel 3 is longer in the X axis direction, but shorter in the Y axis direction. This means that a thinner lens barrel 3 can be obtained.

(18)

When viewed in a direction along the second optical axis A2, the first guide shaft 59 is disposed closer to the filter drive motor 28, and the second guide shaft 69 is disposed closer to the shutter drive motor 27. Therefore, the lens barrel 3 is longer in the X axis direction, but shorter in the Y axis direction. This means that a thinner lens barrel 3 can be obtained.

(19)

The shutter drive motor 27 and the second guide shaft 69 are disposed on one side (the X axis positive direction side) with respect to a plane that includes the first optical axis A1 and the second optical axis A2, and the filter drive motor 28 and the first guide shaft 59 are disposed on the other side (the X axis negative direction side) with respect to the plane that includes the first optical axis A1 and the second optical axis A2. When viewed in a direction along the first optical axis A1, and from the side (Y axis positive direction side) where the shutter drive motor 27 is disposed in front of the second guide shaft 69, the first guide shaft 59 is disposed in front (on the Y axis positive direction side) of the filter drive motor 28. This means that the lens barrel 3 is shorter in the Y axis direction.

The distance between the first guide shaft 59 and the second guide shaft 69 can be increased within the X axial range of the lens barrel 3. This means that the lens barrel 3 can be thinner and more compact. Also, the second support frame 20 and the third support frame 30 can be smoothly guided in a direction along the second optical axis A2.

(20)

With a conventional method for bonding lenses, for example, a second lens is flanked by a support frame and a first lens, and the first lens is adhesively fixed to the support frame. In this case, since the second lens is not bonded, it is not completely fixed, and there is the risk that the second lens will move with respect to the support frame.

However, as shown in FIGS. 13, 14A, and 14B, with this lens barrel 3, since two kinds of groove, the first bonding grooves 21b and the second bonding grooves 21c, are formed in the second support frame 20, the fifth lens L5 and the sixth lens L6 can be individually bonded and fixed to the second support frame 20. This prevents a shift in the relative positions of the fifth lens L5 and the sixth lens L6, and a lens support structure that minimizes a decrease in optical performance can be achieved with a simple configuration.

Other Embodiments

The lens barrel according to the present invention is not limited to the embodiment given above, and various changes and modifications are possible without departing from the gist of the present invention.

(1)

The lens barrel 3 discussed above can be applied not only to a digital camera, but also to a mobile telephone, a PDA (personal digital assistant), and other such imaging devices.

(2)

In the above embodiment, the lens driving device 40 has the pitch driving unit 81 and the yaw driving unit 82 disposed at different positions, but it is also possible for these driving devices to be disposed integrally. In this case, when viewed in a direction along the second optical axis A2, a thinner lens barrel 3 can be obtained if the first driving unit 50 or the second driving unit 60 overlaps this integrated driving device.

Also, the pitch driving unit 81 and the yaw driving unit 82 may each include a plurality of driving devices.

(3)

The first driving unit 50 and the second driving unit 60 may be other kinds of driving devices, such as an electromagnetic actuator.

(4)

In the above embodiment, the first guide shaft 59 and the filter drive motor 28 are disposed on the X axis negative direction side of the first boundary E1, and the second guide shaft 69 and th shutter drive motor 27 are disposed on the X axis positive direction side of the first boundary E1, but these layouts may be reversed in the X axis direction. That is, the first guide shaft 59 and the filter drive motor 28 may be disposed on the X axis positive direction side of the first boundary E1, and the second guide shaft 69 and the shutter drive motor 27 may be disposed on the X axis negative direction side of the first boundary E1.

Also, the layout of the first guide shaft 59 and the second guide shaft 69 may be reversed in the X axis direction. That is, the second guide shaft 69 and the filter drive motor 28 may be disposed on one side of the first boundary E1 (the X axis positive or negative direction side), and the first guide shaft 59 and the shutter drive motor 27 may be disposed on the other side of the first boundary E1 (the opposite side from the side where the second guide shaft 69 is disposed).

(5)

Also, in the above embodiment, the first guide shaft 59 and the shutter drive motor 27 are disposed on the Y axis positive direction side of the second boundary E2, and the second guide shaft 69 and the filter drive motor 28 are disposed on the Y axis negative direction side of the second boundary E2, but the layout of these may be reversed in the Y axis direction. That is, the first guide shaft 59 and the shutter drive motor 27 may be disposed on the Y axis negative direction side of the second boundary E2, and the second guide shaft 69 and the filter drive motor 28 may be disposed on the Y axis positive direction side of the second boundary E2.

Also, the first guide shaft 59 and the second guide shaft 69 may be reversed. That is, the second guide shaft 69 and the shutter drive motor 27 may be disposed on one side of the second boundary E2 (the Y axis positive or negative direction side), and the first guide shaft 59 and the filter drive motor 28 may be disposed on the other side of the second boundary E2 (the opposite side from the side where the second guide shaft 69 is disposed).

Additions

The technology included in the above embodiment will be described from other standpoints.

(1)

An imaging optical system usually has a plurality of lens groups. Whether the refractive power of the first lens group that receives light from a subject is positive or negative affects how small the lens barrel can be made, the magnification ratio of the optical system, and so forth.

For instance, if the first lens group has a positive refractive power (in the case of an imaging optical system that is called a positive lead type), it is easy to attain a high magnification ratio, but the quantity of lenses is greater, which is disadvantageous in terms of making the lens barrel smaller.

On the other hand, if the first lens group has a negative refractive power (in the case of an imaging optical system that is called a negative lead type), it is more difficult to attain a high magnification ratio than with a positive lead type, but there are fewer lenses, which is advantageous in terms of making the lens barrel smaller, and is also suited to achieving a wider angle.

Thus, when the first lens group has a negative refractive power, it is easier to obtain a lens barrel that is compact and has a wider angle.

However, with a negative lead type of imaging optical system, a second lens group and a third lens group having positive refractive power must be provided behind the first lens group, and depending on the layout of the drive mechanisms for the second and third lens groups, efforts to reduce the size of the lens barrel may be hampered.

It is a first object is to provide a lens barrel that has a wider angle and is more compact.

Also, in the fixing of a first lens group including a bending optical element, it is possible for the first lens group to be fixed to a support frame, and the support frame fixed to the camera housing or the main body frame of the lens barrel.

However, when a gap is formed between this support frame and the main body frame, for example, light may leak into the imaging optical system from the outside, which diminishes the optical performance.

It is a second object to minimize the decrease in optical performance in a lens barrel having a bending optical element.

Furthermore, a conventional imaging device is sometimes equipped with an image blur correction device for correcting blurring of images caused by movement of the camera main body. For instance, an image blur correction device may have a base plate, a yaw frame that is supported movably in the yaw direction by the base plate, a pitch frame that is supported movably in the pitch direction by the yaw frame, and a drive device for driving the pitch frame. A correcting lens and an electrical board are fixed to the pitch frame. The drive device has a coil provided to the electrical board, a yoke fixed to the base plate, and a magnet fixed to the yoke.

With this image blur correction device, since the electrical board is fixed on the yaw frame side (the imaging element side) of the pitch frame, the positions of the yoke and magnet move to the imaging device side along with the electrical board, and this reduces the efficiency of the drive device layout. As a result, efforts to reduce the size of the device that drives the correcting lens or other such optical elements are hampered.

It is a third object to provide an optical element drive device that is more compact.

A lens barrel according to Addition 1 is a lens barrel for forming an optical image of a subject, and includes a first lens group, a second lens group, a third lens group, a first support frame, a first support mechanism, a second support mechanism, a first driving unit, and a second driving unit. The first lens group receives a light beam coming from the subject along a first optical axis, and has a bending optical element with which the light beam incident along the first optical axis is reflected in a direction along a second optical axis that intersects the first optical axis, and has an overall negative refractive power. The second lens group receives the light beam that has passed through the first lens group. The third lens group receives the light beam that has passed through the second lens group. The first support frame supports the first lens group. The first support mechanism supports the second lens group so that it can move along the second optical axis with respect to the first lens group, and has a second support frame for supporting the second lens group. The second support mechanism supports the third lens group so that it can move along the second optical axis with respect to the first lens group, and has a third support frame for supporting the third lens group. The first driving unit imparts a drive force to the second support frame so that the second lens group moves in a direction along the second optical axis. The second driving unit that imparts a drive force to the third support frame so that the third lens group moves in a direction along the second optical axis. At least part of the region in which the second support frame moves overlaps the region in which the third support frame moves.

With this lens barrel, the first lens group has an overall negative refractive power, which is more advantageous in terms of obtaining a wide angle.

In addition, since at least part of the region in which the second support frame moves overlaps the region in which the third support frame moves, the size of the lens barrel in a direction along the second optical axis can be reduced.

Thus, a wider angle and a smaller size can be obtained with this lens barrel.

A lens barrel according to Addition 2 is the lens barrel of Addition 1, wherein the first and second driving units are disposed flanking the second optical axis when viewed in a direction along the second optical axis.

A lens barrel according to Addition 3 is the lens barrel of Addition 1 or 2, further including a fourth lens group that receives the light beam that has passed through the third lens group, a third support mechanism that supports the fourth lens group so that it can move over a plane that is perpendicular to the second optical axis with respect to the first lens group, and that has a fourth support frame for supporting the fourth lens group, and a third driving unit that imparts a drive force to the fourth support frame so that the fourth lens group can move with respect to the first lens group. At least one of the first and second driving units overlaps the third driving unit when viewed in a direction along the second optical axis.

The third driving unit here may be made up of a plurality of units, in which case at least one unit may overlap the first and second driving units. For instance, the third driving unit may have a unit for driving the fourth support frame in a first direction that is perpendicular to the second optical axis, and a unit for driving the fourth support frame in a second direction that is perpendicular to the second optical axis.

A lens barrel according to Addition 4 is the lens barrel of Addition 3, wherein the third driving unit has a first direction driving unit for driving the fourth support frame in a first direction that is perpendicular to the second optical axis, and a second direction driving unit for driving the fourth support frame in a second direction that is perpendicular to the second optical axis. At least part of the first driving unit overlaps the first direction driving unit when viewed in a direction along the second optical axis. At least part of the second driving unit overlaps the second direction driving unit when viewed in a direction along the second optical axis.

The first and second driving units here may each be made up of not just one, but a plurality of units.

A lens barrel according to Addition 5 is the lens barrel of Addition 4, wherein, when viewed in a direction along the second optical axis, the outer end of the first driving unit on the opposite side from the second optical axis is disposed at substantially the same position as the outer end of the first direction driving unit on the opposite side from the second optical axis.

The phrase "the outer end of the first driving unit is disposed at substantially the same position as the outer end of the first direction driving unit" here encompasses not only a case in which the two outer ends are disposed at exactly the same position, but also a case in which the two outer ends are shifted to the extent that a reduction in the size of the lens barrel can still be achieved.

A lens barrel according to Addition 6 is the lens barrel of Addition 4 or 5, wherein, when viewed in a direction along the second optical axis, the outer end of the second driving unit on the opposite side from the second optical axis is disposed at substantially the same position as the outer end of the second direction driving unit on the opposite side from the second optical axis.

The phrase "the outer end of the second driving unit is disposed at substantially the same position as the outer end of the second direction driving unit" here encompasses not only a case in which the two outer ends are disposed at exactly the same position, but also a case in which the two outer ends are shifted to the extent that a reduction in the size of the lens barrel can still be achieved.

A lens barrel according to Addition 7 is the lens barrel of any one of Additions 1 to 6, wherein the first driving unit has a first drive shaft that meshes with the second support frame, and a first drive motor that imparts a rotational force to the first drive shaft. The second driving unit has a second drive shaft that meshes with the third support frame, and a second drive motor that imparts a rotational force to the second drive shaft. The first drive motor is disposed on the first lens group side of the second support frame. The second drive motor is disposed on the first lens group side of the third support frame.

A lens barrel according to Addition 8 is the lens barrel of Addition 7, wherein the first drive motor is disposed closer to the first lens group than the second drive motor in a direction along the second optical axis.

A lens barrel according to Addition 9 is the lens barrel of any one of Additions 1 to 8, further including a main body frame to which the first support frame is fixed, and for holding the second lens group. Part of the main body frame overlaps the first support frame when viewed in a direction along the first optical axis.

A lens barrel according to Addition 10 is the lens barrel of Addition 9, wherein the first support frame has a first protrusion that protrudes in a direction along the second optical axis. The first protrusion overlaps the main body frame when viewed in a direction along the first optical axis.

A lens barrel according to Addition 11 is the lens barrel of Addition 3, wherein the fourth support frame has a fourth support frame main body that supports the fourth lens group, and a driven member that is fixed on the first lens group side of the fourth support frame main body and receives the drive force generated by the third driving unit.

A lens barrel according to Addition 12 forms an optical image of a subject, and includes a first lens group that receives a light beam coming from the subject along a first optical axis, and that has a bending optical element with which the light beam incident along the first optical axis is reflected in a direction along a second optical axis that intersects the first optical axis, a second lens group that receives the light beam that has passed through the first lens group, a first support frame for supporting the first lens group, and a main body frame to which the first support frame is fixed, and for holding the second lens group, and which overlaps part of the first support frame when viewed in a direction along the first optical axis.

With this lens barrel, since the first support frame overlaps part of the main body frame when viewed in a direction along the first optical axis, there is less leakage of light into the interior of the barrel from a gap formed between the first support frame and the main body frame, so the decrease in optical performance can be minimized.

A lens barrel according to a Addition 13 is the lens barrel according to Addition 12, wherein the first support frame has a first protrusion that protrudes in a direction along the second optical axis. The first protrusion overlaps the main body frame when viewed in a direction along the first optical axis.

An optical element drive device according to Addition 14 drives a lens group within a plane that is perpendicular to the optical axis, and includes a support frame main body that supports the lens group, a support mechanism that supports the support frame main body so that it can move within a plane that is perpendicular to the optical axis, a driven member that is fixed to the support frame main body and disposed on the incident side of the support frame main body in a direction along the optical axis, and a driving unit that imparts a drive force to the driven member.

With this optical element drive device, since a driven member that receives the drive force generated by a driving unit is disposed on the first lens group side of a support frame main body, the position of the driving unit moves more to the first lens group side than when the driven member is disposed on the opposite side of the support frame main body from the first lens group side. Therefore, with this optical element drive device, the position of the driving unit is even closer to other configurations, the layout efficiency is further improved, and a reduction in size can be achieved.

(2)

A conventional lens barrel is provided with a shutter unit for opening up and blocking off the optical path. This shutter unit has a shutter mechanism, a shutter drive motor for opening and closing the shutter mechanism, a filter provided so as to be capable of being inserting into and retracted from the optical path, and a filter drive motor for driving the filter. The shutter drive motor and the filter drive motor are disposed close to the shutter mechanism and the filter.

However, depending on how these drive motors are disposed, they may hinder efforts to reduce the size of the lens barrel.

It is an object to obtain a smaller lens barrel.

A lens barrel according to Addition 15 is a lens barrel for forming an optical image of a subject, including a first lens group, a second lens group, a third lens group, a first support frame, a first support mechanism, and an optical path blocking unit. The first lens group receives a light beam coming from the subject along a first optical axis, and has a bending optical element with which the light beam incident along the first optical axis is reflected in a direction along a second optical axis that intersects the first optical axis. The second lens group receives the light beam that has passed through the first lens group. The third lens group receives the light beam that has passed through the second lens group. The first support frame supports the first lens group. The first support mechanism supports the second lens group to be movable along the second optical axis with respect to the first lens group, and has a second support frame for supporting the second lens group. The optical path blocking unit has an optical path blocking mechanism provided to be capable of opening and blocking off the optical path along the second optical axis, a blocking drive motor that drives the optical path blocking mechanism, an optical element provided to be capable of being inserted into the optical path along the second optical axis and being retracted from the optical path, and an element drive motor that drives the optical element. The blocking drive motor and the element drive motor are disposed flanking the second optical axis when viewed in a direction along the second optical axis.

With this lens barrel, since the blocking drive motor and the element drive motor are disposed flanking the second optical axis when viewed in a direction along the second optical axis., the optical path blocking unit is longer in one direction, but the length is shorter in the other direction of the optical path blocking unit. This affords a more compact lens barrel.

A lens barrel according to Addition 16 is the lens barrel of Addition 15, further including a second support mechanism that supports the third lens group to be movable along the second optical axis with respect to the first lens group, and has a third support frame supporting the third lens group and a second guide shaft arranged to guide the third support frame in a direction along the second optical axis. The first support mechanism has a first guide shaft arranged to guide the second support frame in a direction along the second optical axis. The first and second guide shafts are disposed flanking the second optical axis when viewed in a direction along the second optical axis.

A lens barrel according to Addition 17 is the lens barrel of Addition 16, wherein the first guide shaft is disposed closer to either the blocking drive motor or the element drive motor when viewed in a direction along the second optical axis, and the second guide shaft is disposed closer to the other of the blocking drive motor and the element drive motor.

A lens barrel according to Addition 18 is the lens barrel of Addition 16, wherein the blocking drive motor and the second guide shaft are disposed on one side with respect to a face including the first optical axis and the second optical axis. The element drive motor and the first guide shaft are disposed on the other side with respect to a face including the first optical axis and the second optical axis. The first guide shaft is disposed in front of the element drive motor when viewed from the side on which the blocking drive motor is disposed in front of the second guide shaft and in a direction along the first optical axis.

A lens barrel according to Addition 19 is the lens barrel of Addition 16, wherein the blocking drive motor and the first guide shaft are disposed on one side with respect to a face including the first optical axis and the second optical axis. The element drive motor and the second guide shaft are disposed on the other side with respect to a face including the first optical axis and the second optical axis. The second guide shaft is disposed in front of the element drive motor when viewed from the side on which the blocking drive motor is disposed in front of the first guide shaft and in a direction along the first optical axis.

Industrial Applicability

Manufacturing costs can be reduced with the lens barrel disclosed above, so the technology disclosed herein is useful in the field of cameras, as well as the field of portable telephones and the like that have a camera function.

The invention claimed is:

1. A lens barrel for forming an optical image of a subject, comprising:
   a first lens group configured to receive a light beam coming from the subject along a first optical axis, the first lens group having a bending optical element configured to reflect a light beam incident along the first optical axis along a second optical axis that intersects the first optical axis;
   a second lens group configured to receive a light beam passing through the first lens group;
   a third lens group configured to receive a light beam passing through the second lens group;
   a first support frame supporting the first lens group;
   a first support mechanism supporting the second lens group movably with respect to the first lens group along the second optical axis, and having a second support frame supporting the second lens group;
   a first driving unit configured to impart a drive force to the second support frame so that the second lens group moves along the second optical axis;
   a luminous energy adjusting unit configured to adjust the amount of light passing through the second lens group or the amount of light emitted from the second lens group, and fixed to the second support frame; and
   an optical path blocking unit configured to open and block the optical path along the second optical axis, and fixed to the second support frame.

2. The lens barrel according to claim 1, wherein the luminous energy adjusting unit is disposed on the first lens group side of the second support frame along the second optical axis.

3. The lens barrel according to claim 2, wherein the optical path blocking unit is disposed on the opposite side of the second support frame from the first lens group side along the second optical axis.

4. The lens barrel according to claim 3, wherein the optical path blocking unit has an optical path blocking mechanism arranged to open and block the optical path along the second optical axis, and a blocking drive motor configured to drive the optical path blocking mechanism, and
   the blocking drive motor is disposed more to the first lens group side than the optical path blocking mechanism along the second optical axis.

5. The lens barrel according to claim 4, further comprising a main body frame to which the first support mechanism is provided, wherein
   the luminous energy adjusting unit has a luminous energy adjusting mechanism with which the aperture can be adjusted by utilizing a rotational force around the second optical axis, and a transmission member configured to transmit the rotational force to the luminous energy adjusting mechanism, and
   the main body frame has a guide portion arranged to convert the linear motion of the second support frame along the second optical axis with respect to the main body frame into rotary motion of the transmission member around the second optical axis.

6. The lens barrel according to claim 5, wherein
   the transmission member extends from the luminous energy adjusting mechanism in a direction perpendicular to the second optical axis, and
   the guide portion has a guide groove into which the transmission member is inserted, and which is inclined with respect to a direction along the second optical axis.

7. The lens barrel according to claim 6, wherein the first lens group has an overall negative refractive power.

8. The lens barrel according to claim 1, wherein the optical path blocking unit is disposed on the opposite side of the second support frame from the first lens group side along the second optical axis.

9. The lens barrel according to claim 8, wherein the optical path blocking unit has an optical path blocking mechanism arranged to open and block the optical path along the second optical axis, and a blocking drive motor configured to drive the optical path blocking mechanism, and
   the blocking drive motor is disposed more to the first lens group side than the optical path blocking mechanism along the second optical axis.

10. The lens barrel according to claim 9, further comprising a main body frame to which the first support mechanism is provided, wherein
    the luminous energy adjusting unit has a luminous energy adjusting mechanism with which the aperture can be adjusted by utilizing a rotational force around the second optical axis, and a transmission member configured to transmit the rotational force to the luminous energy adjusting mechanism, and
    the main body frame has a guide portion arranged to convert the linear motion of the second support frame along the second optical axis with respect to the main body frame into rotary motion of the transmission member around the second optical axis.

11. The lens barrel according to claim 10, wherein
    the transmission member extends from the luminous energy adjusting mechanism in a direction perpendicular to the second optical axis, and
    the guide portion has a guide groove into which the transmission member is inserted, and which is inclined with respect to a direction along the second optical axis.

12. The lens barrel according to claim 11, wherein the first lens group has an overall negative refractive power.

13. The lens barrel according to claim 1, wherein the optical path blocking unit has an optical path blocking mechanism arranged to open and block the optical path along the second optical axis, and a blocking drive motor configured to drive the optical path blocking mechanism, and
    the blocking drive motor is disposed more to the first lens group side than the optical path blocking mechanism along the second optical axis.

14. The lens barrel according to claim 13, further comprising
    a main body frame to which the first support mechanism is provided, wherein
    the luminous energy adjusting unit has a luminous energy adjusting mechanism with which the aperture can be adjusted by utilizing a rotational force around the second optical axis, and a transmission member configured to transmit the rotational force to the luminous energy adjusting mechanism, and
    the main body frame has a guide portion arranged to convert the linear motion of the second support frame along the second optical axis with respect to the main body frame into rotary motion of the transmission member around the second optical axis.

15. The lens barrel according to claim 14, wherein
    the transmission member extends from the luminous energy adjusting mechanism in a direction perpendicular to the second optical axis, and the guide portion has a guide groove into which the transmission member is inserted, and which is inclined with respect to a direction along the second optical axis.

16. The lens barrel according to claim 15, wherein
the first lens group has an overall negative refractive power.

17. The lens barrel according to claim 1, further comprising
a main body frame to which the first support mechanism is provided, wherein
the luminous energy adjusting unit has a luminous energy adjusting mechanism with which the aperture can be adjusted by utilizing a rotational force around the second optical axis, and a transmission member configured to transmit the rotational force to the luminous energy adjusting mechanism, and
the main body frame has a guide portion arranged to convert the linear motion of the second support frame along the second optical axis with respect to the main body frame into rotary motion of the transmission member around the second optical axis.

18. The lens barrel according to claim 17, wherein
the transmission member extends from the luminous energy adjusting mechanism in a direction perpendicular to the second optical axis, and
the guide portion has a guide groove into which the transmission member is inserted, and which is inclined with respect to a direction along the second optical axis.

\* \* \* \* \*